(12) United States Patent
Bitz

(10) Patent No.: US 10,437,293 B2
(45) Date of Patent: Oct. 8, 2019

(54) MULTI-AXIS HINGE

(71) Applicant: Microsoft Technology Licensing, LLC, Redmond, WA (US)

(72) Inventor: Brian Bitz, Sherwood, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/360,652

(22) Filed: Nov. 23, 2016

(65) Prior Publication Data

US 2018/0088634 A1 Mar. 29, 2018

Related U.S. Application Data

(60) Provisional application No. 62/399,189, filed on Sep. 23, 2016.

(51) Int. Cl.
*E05D 15/00* (2006.01)
*G06F 1/16* (2006.01)
(Continued)

(52) U.S. Cl.
CPC .............. *G06F 1/1681* (2013.01); *E05D 1/04* (2013.01); *E05D 3/06* (2013.01); *E05D 11/082* (2013.01);
(Continued)

(58) Field of Classification Search
CPC ...... G06F 1/168; G06F 1/1681; G06F 1/1616; G06F 1/1637; G06F 1/547; E05Y 2900/602; E05Y 2900/606; H04M 1/022; H04M 1/0214; H04M 1/0216; E05D 3/12; E05D 3/122; E05D 3/14; E05D 3/16; E05D 3/06; E05D 7/12; E05D 11/06; E05D 11/10; Y10T 16/54038; Y10T 16/5403; Y10T 16/54033; Y10T 16/547; Y10T 16/5474; Y10T 16/5475
See application file for complete search history.

(56) References Cited

U.S. PATENT DOCUMENTS 3,289,877 A 12/1966 Hans
4,355,666 A 10/1982 Torii
(Continued)

FOREIGN PATENT DOCUMENTS

CN 101123628 A 2/2008
CN 101840247 A 9/2010
(Continued)

OTHER PUBLICATIONS

Amended claims filed Dec. 22, 2016 from PCT Patent Application No. PCT/US2015/059798, 6 pages.
(Continued)

*Primary Examiner* — Chuck Y Mah
(74) *Attorney, Agent, or Firm* — Rainier Patents, P.S.

(57) ABSTRACT

Technologies are described relating to sequential multi-axis hinges that rotatably secure portions of a computing device. One example can include a set of hinges that rotate around a set of hinge shafts. The example can also include a shuttle cam through which an individual hinge shaft passes. The shuttle cam can be configured to move orthogonally relative to the individual hinge shaft to block rotation of the individual hinge shaft or an adjacent individual hinge shaft.

20 Claims, 15 Drawing Sheets

(51) Int. Cl.
    *E05D 3/06*         (2006.01)
    *E05D 11/08*      (2006.01)
    *E05D 1/04*        (2006.01)
    *H04M 1/02*       (2006.01)

(52) U.S. Cl.
    CPC ............ *G06F 1/166* (2013.01); *G06F 1/1616* (2013.01); *G06F 1/1654* (2013.01); *G06F 1/1679* (2013.01); *H04M 1/0216* (2013.01); *E05D 2011/085* (2013.01); *E05Y 2900/606* (2013.01)

(56) References Cited

U.S. PATENT DOCUMENTS

| | | | |
|---|---|---|---|
| 4,611,710 A | 9/1986 | Mitsufuji | |
| 4,617,699 A | 10/1986 | Nakamura | |
| 4,711,046 A | 12/1987 | Herrgord | |
| 4,845,809 A | 7/1989 | Pillifant, Jr. | |
| 5,056,192 A | 10/1991 | Grass | |
| 5,229,921 A | 7/1993 | Bohmer | |
| 5,448,799 A | 9/1995 | Stein, Jr. | |
| 5,456,195 A | 10/1995 | Ozaku et al. | |
| 5,509,590 A | 4/1996 | Medeiros, Jr. | |
| 5,796,575 A | 8/1998 | Podwalny et al. | |
| 5,845,366 A | 12/1998 | Kuroda | |
| 5,987,704 A | 11/1999 | Tang | |
| 6,223,393 B1* | 5/2001 | Knopf .................. | G06F 1/1681 16/366 |
| 6,421,235 B2 | 7/2002 | Ditzik | |
| 6,470,532 B2 | 10/2002 | Rude | |
| 6,505,382 B1 | 1/2003 | Lam et al. | |
| 6,527,036 B1 | 3/2003 | Welsh | |
| 6,754,081 B2 | 6/2004 | Rude et al. | |
| 6,757,160 B2 | 6/2004 | Moore et al. | |
| 6,831,229 B1 | 12/2004 | Maatta et al. | |
| 6,952,861 B2 | 10/2005 | Ynosencio | |
| 6,966,435 B2 | 11/2005 | Weiser et al. | |
| 7,140,074 B2 | 11/2006 | Han et al. | |
| 7,155,266 B2 | 12/2006 | Stefansen | |
| 7,227,741 B2 | 6/2007 | Garel et al. | |
| 7,251,129 B2 | 7/2007 | Lee et al. | |
| 7,293,380 B2 | 11/2007 | Repecki | |
| 7,418,766 B2 | 9/2008 | Nelson et al. | |
| 7,520,025 B2 | 4/2009 | Hung | |
| 7,584,524 B2 | 9/2009 | Hung | |
| 7,636,985 B2 | 12/2009 | Greenbank | |
| 7,758,082 B2 | 7/2010 | Weigel et al. | |
| 7,966,694 B2 | 6/2011 | Estlander | |
| 8,024,843 B2 | 9/2011 | Endo et al. | |
| 8,032,988 B2 | 10/2011 | Lai et al. | |
| 8,122,970 B2 | 2/2012 | Palen | |
| 8,170,630 B2* | 5/2012 | Murayama ............ | H04M 1/022 16/330 |
| 8,441,791 B2 | 5/2013 | Bohn et al. | |
| 8,451,601 B2 | 5/2013 | Bohn et al. | |
| 8,467,838 B2 | 6/2013 | Griffin et al. | |
| 8,590,857 B2 | 11/2013 | Chen et al. | |
| 8,624,844 B2 | 1/2014 | Behar et al. | |
| 8,649,166 B2 | 2/2014 | Wu | |
| 8,687,354 B2 | 4/2014 | Uchiyama et al. | |
| 8,687,359 B2 | 4/2014 | Theobald et al. | |
| 8,713,759 B2 | 5/2014 | Cai | |
| 8,743,538 B2 | 6/2014 | Ashcraft et al. | |
| 8,776,319 B1* | 7/2014 | Chang .................. | G06F 1/1681 16/303 |
| 8,796,524 B1 | 8/2014 | Deck | |
| 8,797,727 B2 | 8/2014 | Ashcraft et al. | |
| 8,804,324 B2 | 8/2014 | Bohn et al. | |
| 8,826,495 B2 | 9/2014 | Jauvtis et al. | |
| 8,843,183 B2 | 9/2014 | Griffin et al. | |
| 8,854,834 B2 | 10/2014 | O'Connor et al. | |
| 9,047,055 B2 | 6/2015 | Song | |
| 9,243,432 B2 | 1/2016 | Lee | |
| 9,268,372 B1* | 2/2016 | Hsu .................. | G06F 1/1681 |
| 9,290,976 B1 | 3/2016 | Horng | |
| 9,371,676 B2 | 6/2016 | Rittenhouse | |
| 9,411,365 B1 | 8/2016 | Tanner et al. | |
| 9,625,947 B2 | 4/2017 | Lee et al. | |
| 9,625,953 B2 | 4/2017 | Bitz et al. | |
| 9,625,954 B2 | 4/2017 | Campbell et al. | |
| 2004/0091101 A1 | 5/2004 | Park et al. | |
| 2004/0266239 A1 | 12/2004 | Kurokawa | |
| 2005/0122671 A1 | 6/2005 | Homer | |
| 2005/0155182 A1 | 7/2005 | Han et al. | |
| 2006/0005356 A1 | 1/2006 | Amano et al. | |
| 2006/0046792 A1 | 3/2006 | Hassemer et al. | |
| 2006/0079277 A1 | 4/2006 | Ditzik | |
| 2007/0039132 A1 | 2/2007 | Jung et al. | |
| 2007/0049376 A1 | 3/2007 | Cho et al. | |
| 2007/0107163 A1 | 5/2007 | Barnett | |
| 2007/0117600 A1* | 5/2007 | Robertson, Jr. ...... | H04M 1/0216 455/575.3 |
| 2007/0247799 A1 | 10/2007 | Nie et al. | |
| 2008/0112113 A1 | 5/2008 | Sawadski et al. | |
| 2008/0174089 A1 | 7/2008 | Ekberg | |
| 2008/0250604 A1 | 10/2008 | Chen et al. | |
| 2009/0147458 A1 | 6/2009 | Wang et al. | |
| 2010/0154171 A1 | 6/2010 | Lombardi et al. | |
| 2010/0232100 A1* | 9/2010 | Fukuma .................. | F16G 13/18 361/679.01 |
| 2011/0000136 A1 | 1/2011 | Brun | |
| 2011/0099756 A1 | 5/2011 | Chen | |
| 2011/0177850 A1 | 7/2011 | Griffin et al. | |
| 2011/0292605 A1 | 12/2011 | Chen | |
| 2012/0046076 A1 | 2/2012 | Masser et al. | |
| 2012/0120618 A1 | 5/2012 | Bohn | |
| 2012/0120627 A1 | 5/2012 | O'connor et al. | |
| 2012/0127471 A1 | 5/2012 | Urushidani | |
| 2012/0137471 A1* | 6/2012 | Kujala .................. | G06F 1/1681 16/382 |
| 2012/0147542 A1 | 6/2012 | Kim | |
| 2012/0206893 A1 | 8/2012 | Bohn et al. | |
| 2012/0272481 A1 | 11/2012 | Ahn et al. | |
| 2012/0279014 A1 | 11/2012 | Carlsson | |
| 2012/0307472 A1 | 12/2012 | Bohn et al. | |
| 2013/0014346 A1 | 1/2013 | Ahn et al. | |
| 2013/0046492 A1 | 2/2013 | Westergaard | |
| 2013/0081229 A1 | 4/2013 | Hirano | |
| 2013/0111704 A1 | 5/2013 | Mitsui | |
| 2013/0135809 A1 | 5/2013 | Uchiyama et al. | |
| 2013/0139355 A1 | 6/2013 | Lee et al. | |
| 2013/0152342 A1 | 6/2013 | Ahn | |
| 2013/0194741 A1* | 8/2013 | Uchiyama ............. | G06F 1/1681 361/679.26 |
| 2013/0216740 A1 | 8/2013 | Russell-Clarke | |
| 2013/0219663 A1 | 8/2013 | Cai | |
| 2013/0318746 A1 | 12/2013 | Kuramochi | |
| 2014/0042293 A1 | 2/2014 | Mok et al. | |
| 2014/0084772 A1 | 3/2014 | Zhang et al. | |
| 2014/0111954 A1 | 4/2014 | Lee et al. | |
| 2014/0126133 A1* | 5/2014 | Griffin .................. | G06F 1/1652 361/679.27 |
| 2014/0160055 A1 | 6/2014 | Margolis et al. | |
| 2014/0174226 A1* | 6/2014 | Hsu ........................ | E05D 3/122 74/98 |
| 2014/0174227 A1 | 6/2014 | Hsu | |
| 2014/0196253 A1 | 7/2014 | Song | |
| 2014/0196254 A1* | 7/2014 | Song ........................ | E05D 3/14 16/302 |
| 2014/0217875 A1* | 8/2014 | Park ..................... | H05K 5/0226 312/326 |
| 2014/0226275 A1 | 8/2014 | Ko et al. | |
| 2014/0239065 A1 | 8/2014 | Zhou et al. | |
| 2014/0245569 A1 | 9/2014 | Cho | |
| 2014/0246354 A1 | 9/2014 | Probst et al. | |
| 2014/0287804 A1 | 9/2014 | Bohn et al. | |
| 2014/0290008 A1 | 10/2014 | Hsu | |
| 2014/0290009 A1 | 10/2014 | Kasai et al. | |
| 2014/0338483 A1* | 11/2014 | Hsu ........................ | F16H 21/44 74/96 |
| 2014/0352757 A1 | 12/2014 | Ramirez | |
| 2014/0360296 A1 | 12/2014 | Hsu | |

(56) References Cited

U.S. PATENT DOCUMENTS

| | | | |
|---|---|---|---|
| 2015/0016040 | A1 | 1/2015 | Hood et al. |
| 2015/0092331 | A1 | 4/2015 | Kinoshita et al. |
| 2015/0138103 | A1 | 5/2015 | Nishi |
| 2015/0138712 | A1 | 5/2015 | Solland |
| 2015/0153787 | A1 | 6/2015 | Mok et al. |
| 2015/0176317 | A1* | 6/2015 | Lee .................. E05D 3/06 16/251 |
| 2015/0227175 | A1 | 8/2015 | Motosugi |
| 2015/0277505 | A1* | 10/2015 | Lim .................. G06F 1/1681 361/679.27 |
| 2015/0277506 | A1 | 10/2015 | Cheah |
| 2015/0361696 | A1 | 12/2015 | Tazbaz |
| 2015/0362956 | A1 | 12/2015 | Tazbaz |
| 2015/0370287 | A1 | 12/2015 | Ko et al. |
| 2016/0132075 | A1 | 5/2016 | Tazbaz |
| 2016/0132076 | A1* | 5/2016 | Bitz .................. G06F 1/1681 361/679.27 |
| 2016/0139634 | A1 | 5/2016 | Cho et al. |
| 2016/0139639 | A1 | 5/2016 | Dash et al. |
| 2016/0147267 | A1* | 5/2016 | Campbell .......... G06F 1/1681 361/679.27 |
| 2016/0187935 | A1 | 6/2016 | Tazbaz et al. |
| 2016/0201367 | A1 | 7/2016 | Kato |
| 2016/0215541 | A1 | 7/2016 | Tazbaz et al. |
| 2016/0224072 | A1* | 8/2016 | Huang .................. E05D 7/06 |
| 2016/0349802 | A1* | 12/2016 | Ahn .................. G06F 1/1641 |
| 2016/0357226 | A1 | 12/2016 | Campbell et al. |
| 2017/0090523 | A1 | 3/2017 | Tazbaz et al. |
| 2018/0059735 | A1 | 3/2018 | Tazbaz et al. |
| 2018/0066465 | A1 | 3/2018 | Tazbaz et al. |

FOREIGN PATENT DOCUMENTS

| | | |
|---|---|---|
| CN | 103161819 A | 6/2013 |
| CN | 103291737 A | 9/2013 |
| CN | 203626454 U | 6/2014 |
| CN | 203669484 U | 6/2014 |
| CN | 104019120 A | 9/2014 |
| CN | 204553530 U | 8/2015 |
| EP | 0844357 A1 | 5/1998 |
| EP | 1340879 A2 | 9/2003 |
| EP | 1422593 A1 | 5/2004 |
| EP | 1464784 A1 | 10/2004 |
| EP | 2728433 A1 | 5/2014 |
| EP | 2765478 A2 | 8/2014 |
| EP | 2765479 A2 | 8/2014 |
| JP | 2010218102 A | 9/2010 |
| JP | 2013249855 A | 12/2013 |
| KR | 20140049911 A | 4/2014 |
| RU | 132118 U1 | 9/2013 |
| WO | 2016/077254 A1 | 5/2016 |

OTHER PUBLICATIONS

International Preliminary Report on Patentability dated Jan. 30, 2017 from PCT Patent Application No. PCT/US2015/059798, 6 pages.
Communication pursuant to Rules 161(1) and 162 EPC dated Jun. 21, 2017 from European Patent Application No. 15797752.1, 2 pages.
Non-Final Office Action dated Mar. 29, 2016 from U.S. Appl. No. 14/588,138, 34 pages.
Response filed Jun. 29, 2016 to the Non-Final Office Action dated Mar. 29, 2016 from U.S. Appl. No. 14/588,138, 10 pages.
Final Office Action dated Jul. 29, 2016 from U.S. Appl. No. 14/588,138, 31 pages.
Response filed Oct. 31, 2016 to the Final Office Action dated Jul. 29, 2016 from U.S. Appl. No. 14/588,138, 10 pages.
Non-Final Office Action dated Jan. 20, 2017 from U.S. Appl. No. 14/588,138, 12 pages.
Response filed Apr. 10, 2017 to the Non-Final Office Action dated Jan. 20, 2017 from U.S. Appl. No. 14/588,138, 8 pages.
Notice of Allowance dated May 18, 2017 from U.S. Appl. No. 14/588,138, 41 pages.
Notice of Allowance dated Jul. 10, 2017 from U.S. Appl. No. 14/588,138, 6 pages.
International Search Report and Written Opinion dated Feb. 22, 2016 from PCT Patent Application No. PCT/US2015/064173, 13 pages.
Response and Demand dated Jun. 15, 2016 from PCT Patent Application No. PCT/US2015/064173, 13 pages.
International Preliminary Report on Patentability dated Nov. 29, 2016 from PCT Patent Application No. PCT/US2015/064173, 6 pages.
Non-Final Office Action dated Dec. 10, 2015 from U.S. Appl. No. 14/606,979, 20 pages.
Response filed Mar. 3, 2016 to the Non-Final Office Action dated Dec. 10, 2015 from U.S. Appl. No. 14/606,979, 16 pages.
Final Office Action dated Jun. 1, 2016 from U.S. Appl. No. 14/606,979, 48 pages.
Response filed Aug. 26, 2016 to the Final Office Action dated Jun. 1, 2016 from U.S. Appl. No. 14/606,979, 15 pages.
Applicant-Initiated Interview Summary dated Aug. 29, 2016 from U.S. Appl. No. 14/606,979, 3 pages.
Non-Final Office Action and Examiner-Initiated Interview Summary dated Sep. 22, 2016 from U.S. Appl. No. 14/606,979, 27 pages.
Interview Summary filed Oct. 11, 2016 from U.S. Appl. No. 14/606,979, 2 pages.
Response filed Dec. 13, 2016 to the Non-Final Office Action dated Sep. 22, 2016 from U.S. Appl. No. 14/606,979, 22 pages.
Final Office Action and Examiner-Initiated Interview Summary dated Mar. 15, 2017 from U.S. Appl. No. 14/606,979, 56 pages.
International Search Report and Written Opinion dated Apr. 12, 2016 from PCT Patent Application No. PCT/US2016/013815, 19 pages.
Demand and Response filed Nov. 28, 2016 to the Written Opinion dated Apr. 12, 2016 from PCT Patent Application No. PCT/US2016/013815, 10 pages.
Second Written Opinion dated Jan. 2, 2017 from PCT Patent Application No. PCT/US2016/013815, 6 pages.
International Preliminary Report on Patentability dated Apr. 4, 2017 from PCT Patent Application No. PCT/US2016/013815, 9 pages.
Non-Final Office Action dated Apr. 12, 2016 from U.S. Appl. No. 14/555,184, 32 pages.
Response filed Jun. 29, 2016 to the Non-Final Office Action dated Apr. 12, 2016 from U.S. Appl. No. 14/555,184, 10 pages.
Notice of Allowance dated Jul. 14, 2016 from U.S. Appl. No. 14/555,184, 15 pages.
Corrected Notice of Allowability dated Aug. 4, 2016 from U.S. Appl. No. 14/555,184, 16 pages.
Notice of Allowance dated Oct. 24, 2016 from U.S. Appl. No. 14/555,184, 11 pages.
Corrected Notice of Allowability dated Oct. 31, 2016 from U.S. Appl. No. 14/555,184, 6 pages.
Corrected Notice of Allowability dated Nov. 21, 2016 from U.S. Appl. No. 14/555,184, 6 pages.
Corrected Notice of Allowability dated Dec. 14, 2016 from U.S. Appl. No. 14/555,184, 6 pages.
Notice of Allowance dated Feb. 3, 2017 from U.S. Appl. No. 14/555,184, 18 pages.
Corrected Notice of Allowability dated Mar. 16, 2017 from U.S. Appl. No. 14/555,184, 8 pages.
International Search Report dated Jan. 25, 2016 from PCT Patent Application No. PCT/US2015/060959, 11 pages.
Article 34 Demand filed Jun. 8, 2016 from PCT Patent Application No. PCT/US2015/060959, 14 pages.
Second Written Opinion dated Oct. 10, 2016 from PCT Patent Application No. PCT/US2015/060959, 7 pages.
Response filed Dec. 7, 2016 to the Second Written Opinion dated Oct. 10, 2016 from PCT Patent Application No. PCT/US2015/060959, 8 pages.
International Preliminary Report on Patentability dated Mar. 3, 2017 from PCT Patent Application No. PCT/US2015/060959, 7 pages.

(56) References Cited

OTHER PUBLICATIONS

Preliminary Amendment filed Sep. 26, 2016 from U.S. Appl. No. 15/239,417, 7 pages.
Non-Final Office Action dated May 25, 2017 from U.S. Appl. No. 15/239,417, 71 pages.
Non-Final Office Action dated Mar. 31, 2016 from U.S. Appl. No. 14/538,786, 16 pages.
Response filed Jun. 30, 2016 to the Non-Final Office Action dated Mar. 31, 2016 from U.S. Appl. No. 14/538,786, 12 pages.
Supplemental Response filed Dec. 8, 2016 to the Response filed Jun. 30, 2016 from U.S. Appl. No. 14/538,786, 8 pages.
Notice of Allowance dated Dec. 27, 2016 from U.S. Appl. No. 14/538,786, 54 pages.
Corrected Notice of Allowability dated Jan. 13, 2017 from U.S. Appl. No. 14/538,786, 26 pages.
Corrected Notice of Allowability dated Jan. 25, 2017 from U.S. Appl. No. 14/538,786, 6 pages.
Corrected Notice of Allowability dated Mar. 21, 2017 from U.S. Appl. No. 14/538,786, 10 pages.
International Search Report and Written Opinion dated Jan. 4, 2016 from PCT Patent Application No. PCT/US2015/059799, 13 pages.
Response and Demand filed Apr. 6, 2016 from PCT Patent Application No. PCT/US2015/059799, 20 pages.
Second Written Opinion dated Oct. 31, 2016 from PCT Patent Application No. PCT/US2015/059799, 8 pages.
Response filed Dec. 8, 2016 to the Second Written Opinion dated Oct. 31, 2016 from PCT Patent Application No. PCT/US2015/059799, 12 pages.
International Preliminary Report on Patentability dated Jan. 24, 2017 from PCT Patent Application No. PCT/US2015/059799, 8 pages.
Communication pursuant to Rules 161(1) and 162 EPC dated Jun. 21, 2017 from European Patent Application No. 15797753.9, 2 pages.
Article 34 Amendment filed Jun. 14, 2017 from Korean Patent Application No. 10-2017-7015834, 10 pages. (No English Translation).
Non-Final Office Action dated Jan. 6, 2017 from U.S. Appl. No. 14/866,697, 72 pages.
Response filed Mar. 29, 2017 to the Non-Final Office Action dated Jan. 6, 2017 from U.S. Appl. No. 14/866,697, 10 pages.
Communication pursuant to Rules 161(1) and 162 EPC dated Aug. 8, 2017 from European Patent Application No. 15816331.1, 2 pages.
Article 34 Amendment filed Aug. 1, 2017 from Korean Patent Application No. 10-2017-7021309, 36 pages. (No English Translation).
Response filed Aug. 15, 2017 to the Final Office Action dated Mar. 15, 2017 from U.S. Appl. No. 14/606,979, 12 pages.
Applicant-Initiated Interview Summary dated Aug. 15, 2017 from U.S. Appl. No. 15/239,417, 3 pages.
Response filed Aug. 23, 2017 to the Non-Final Office Action dated May 25, 2017 from U.S. Appl. No. 15/239,417, 9 pages.
Communication pursuant to Rules 161(1) and 162 EPC dated Jul. 4, 2017 from European Patent Application No. 15801625.3, 2 pages.
Second Written Opinion dated Aug. 1, 2017 from PCT Patent Application No. PCT/US2016/048898, 9 pages.
Notice of Allowability dated Sep. 1, 2017 from U.S. Appl. No. 14/588,138, 16 pages.
International Search Report and Written Opinion dated Nov. 14, 2016 from PCT Patent Application No. PCT/US2016/048898, 16 pages.
Demand filed Jun. 7, 2017 with Response to the International Search Report and Written Opinion from PCT Patent Application No. PCT/US2016/048898, 14 pages.
"Bi-Fold Hinges", captured by the Internet archive at <<http://web.archive.org/web/20120509195241/http://catalog.monroehinge.com/category/bi-fold-hinges>>, on May 9, 2012, 2 pages.
"Finger Protecta", retrieved from <<http://shop.stormflame.com/finger-protecta-142-p.asp>> on Sep. 9, 2014, 2 pages.

"Fingersafe", May 26, 2013, retrieved from <<http://fingersafe.com/>> on Sep. 9, 2014, 2 pages.
"Laptop back covers shell for Dell 15R 5520 7520 M521R 5525 PN T87MC laptop hinge cover", retrieved from <<http://www.alibaba.com/product-detail/Laptop-back-covers-shell-For-Dell_1628979107.html>> on Sep. 8, 2014, 3 pages.
Moving Point Hinge-Multipivot Hinge, retrieved at: <<http://websystem.gismo.se/Gismo/files/1029/2.mph%2001%20introduktion.pdf>> on Oct. 9, 2014, 6 pages.
Plastic Slatband Chains, retrieved at <<http://www.irp.co.za/wp-content/assets/LFC002-7.5-Straight-Running-Double-Hinge-Chain.pdf>> on Sep. 10, 2015, 1 page.
"Polyprop Boxes Accessories", Jun. 28, 2013, retrieved from <<http://www.presentingbinders.co.uk/Polyprop_Boxes_Accessories.html>> on Sep. 10, 2014, 6 pages.
"Samet SoftCover hinge wins the Innovation Award 2013", Feb. 8, 2013, retrieved from <<http://www.kozsusanidesign.com/samet-softcover-hinge-wins-the-innovation-award-2013/>> on Sep. 9, 2014, 2 pages.
"Single and double hinge type LBP (820 & 821 LBP)", retrieved on Sep. 10, 2015, at <<http://www.papadopoulos-bros.gr/en/proionta/erpystries-metaforikes-tainies/erpystries/plastikes/eutheias/monou-kai-diplou-mentese-typou-lbp-820-821-lbp/>>, 1 page.
"System Plast LF 820 K400 Acetal Straight Running Chain, 4 Width, 120" Length, Single Hinge", retrieved on Sep. 10, 2015, at <<http://www.amazon.com/System-Plast-Acetal-Straight-Running/dp/B00MJXUDIA>>, 3 pages.
Elliott, Amy-Mae, "9 Nifty Laptop Feet to Keep Your PC Running Cool", published on Jul. 30, 2012, retrieved at <<http://mashable.com/2012/07/30/laptop-feet/>>, 26 pages.
"Multi-function stainless steel hydraulic shower door pivot hinge", retrieved on Sep. 10, 2015, at <<http://www.alibaba.com/product-detail/Multi-function-stainless-steel-hydraulic-shower_60153561047.html>> 10 pages.
Non-Final Office Action dated Feb. 22, 2016 from U.S. Appl. No. 14/538,775, 23 pages.
Response filed Jun. 29, 2016 to the Non-Final Office Action dated Feb. 22, 2016 from U.S. Appl. No. 14/538,775, 12 pages.
Final Office Action dated Oct. 14, 2016 from U.S. Appl. No. 14/538,775, 63 pages.
Applicant-Initiated Interview Summary dated Dec. 20, 2016 from U.S. Appl. No. 14/538,775, 3 pages.
Response filed Jan. 3, 2017 to the Final Office Action dated Oct. 14, 2016 from U.S. Appl. No. 14/538,775, 9 pages.
Non-Final Office Action dated Feb. 24, 2017 from U.S. Appl. No. 14/538,775, 42 pages.
Response filed Apr. 20, 2017 to the Non-Final Office Action dated Feb. 24, 2017 from U.S. Appl. No. 14/538,775, 9 pages.
Notice of Allowance and Examiner-Initiated Interview Summary dated Jul. 10, 2017 from U.S. Appl. No. 14/538,775, 19 pages.
International Search Report dated Jan. 4, 2016 from PCT Patent Application No. PCT/US2015/059798, 13 pages.
Article 34 Demand filed May 4, 2016 from PCT Patent Application No. PCT/US2015/059798, 17 pages.
"Straight Running Chains", published Jul. 15, 2013, retrieved at <<http://www.ultraplastindia.com/stainless-steel-slat-chains.html>>, 3 pages.
Response filed Jul. 20, 2017 to the Communication pursuant to Rules 161(1) and 162 EPC dated Jun. 21, 2017 from European Patent Application No. 15797752.1, 6 pages.
Final Office Action dated Jul. 19, 2017 from U.S. Appl. No. 14/866,697, 40 pages.
Non-Final Office Action dated Oct. 27, 2017 from U.S. Appl. No. 14/606,979, 23 pages.
"International Search Report and Written Opinion Issued in PCT Application No. PCT/US2017/051683", dated Nov. 23, 2017, 13 Pages.
Notice of Allowance dated Sep. 12, 2017 from U.S. Appl. No. 15/239,417, 20 pages.
Corrected Notice of Allowability dated Sep. 26, 2017 from U.S. Appl. No. 15/239,417, 12 pages.
Response filed Sep. 13, 2017 to the Final Office Action dated Jul. 19, 2017 from U.S. Appl. No. 14/866,697, 11 pages.

(56) References Cited

OTHER PUBLICATIONS

Applicant Initiated Interview Summary dated Sep. 18, 2017 from U.S. Appl. No. 14/866,697, 3 pages.
Notice of Allowance dated Sep. 26, 2017 from U.S. Appl. No. 14/866,697, 13 pages.
Final Office Action dated Feb. 27, 2018 from U.S. Appl. No. 14/606,979, 8 pages.
International Preliminary Report on Patentability dated Jan. 2, 2018 from PCT Patent Application No. PCT/US2016/048898, 20 pages.
"360 deg Hinge Video", Retrieved From: https://www.youtube.com/watch?v=lhEczMl4nsw, Jul. 21, 2013, 1 Page.
"Special Purpose Hinges (cont.)", Retrieved From: https://hingedummy.info/special/purposepage2.htm , Jan. 4, 2007, 2 Pages.
"Non Final Office Action issued in U.S. Appl. No. 15/256,302", dated Jun. 9, 2017, 12 Pages.
Smith, Daria, "Microsoft Helps HP Design New Convertible Spectre x360", Retrieved From: http://blog.parts-people.com/2015/03/03/microsoft-helps-hp-design-ne-convertible-spectre-x360, Mar. 3, 2015, 1 Page.
"Office Action Issued in European Patent Application No. 16706038.3", dated Feb. 19, 2019, 5 Pages.
"Office Action Issued in European Patent Application No. 16763393.2", dated Mar. 5, 2019, 6 Pages.
"First Office Action and Search Report Issued in Chinese Patent Application No. 201580064618.7", dated May 5, 2019, 12 Pages.
"Office Action Issued in Chinese Patent Application No. 201680007517.0", dated Jun. 27, 2019, 16 pages.
"Office Action Issued in Japanese Patent Application No. 2017-519501", dated Jun. 25, 2019, 6 Pages.
"Office Action Issued in Russian Patent Application No. 2017118149", dated Jun. 4, 2019, 5 Pages.
"Office Action Issued in Chinese Patent Application No. 201580061294.1", dated Jul. 1, 2019, 10 Pages.

\* cited by examiner

MULTI-AXIS HINGE

PRIORITY

This utility application claims priority from U.S. Provisional 62/399,189, filed on Sep. 23, 2016, which is incorporated by reference in its entirety.

DETAILED DESCRIPTION

Some computing devices, such as a tablet or a touch screen device, can be used for a variety of purposes including displaying books, interacting with applications, browsing the Internet, reading email, or other similar activities. For certain applications, more processing power and input capabilities are desired. Input devices, such as keyboards, can be attached to tablet devices to allow additional interactions, such as, editing documents, filling in forms, composing emails, and other similar activities. The attachment of input devices, such as a keyboard, can enable tablet-style computing devices to provide convenience similar to a laptop and enable lap-top style computing devices to have flexibility similar to a tablet. In these scenarios, a first device portion, such as a display can be removeably rotatably coupled to a second device portion, such as another display and/or an input device. A manner in which the first and second portions are removeably rotatably coupled can enhance or diminish the user experience. For instance, if the device tips backwards when the user tries to use it, the user experience is diminished. Further, in touch display scenarios, the user experience can be diminished if the touch display bounces when the user touches it. Toward these ends, some of the present implementations relate to sequential multi-axis hinge assemblies that rotatably couple the device portions and that can reduce device tipping and/or reduce display bounce, among other advantages.

Figure 1A:
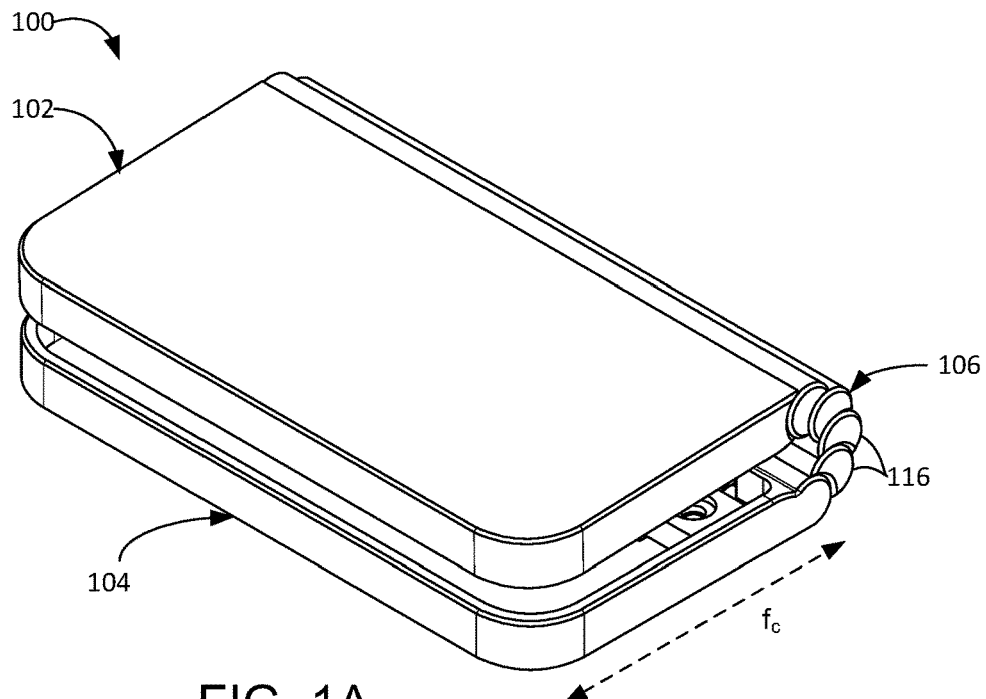
FIGS. 1A-1C illustrate perspective views of an example device that includes a sequential multi-axis hinge assembly in accordance with some implementations.
Figure 1B:
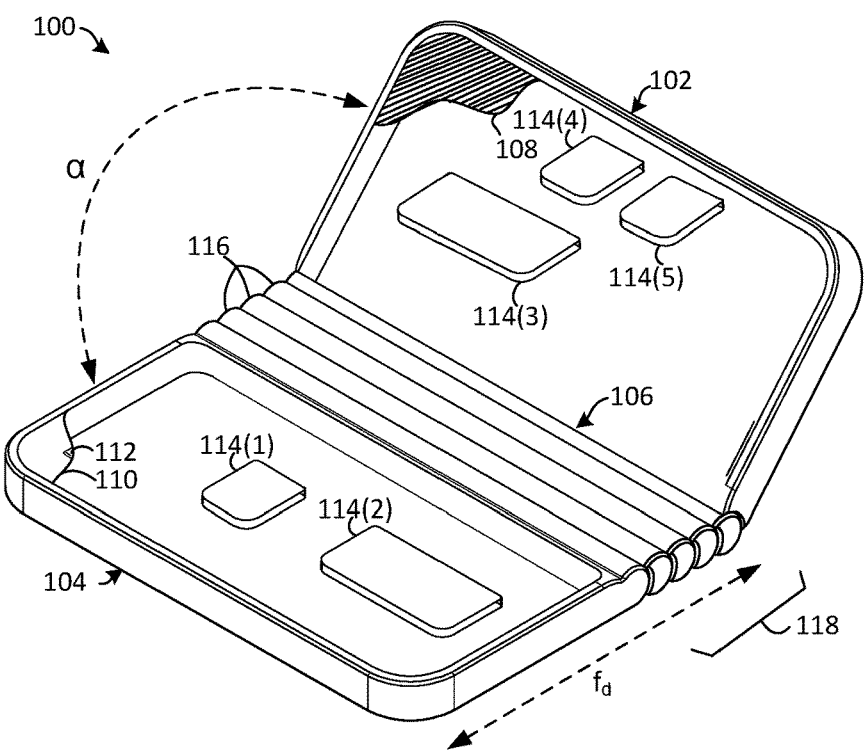
Figure 1C:
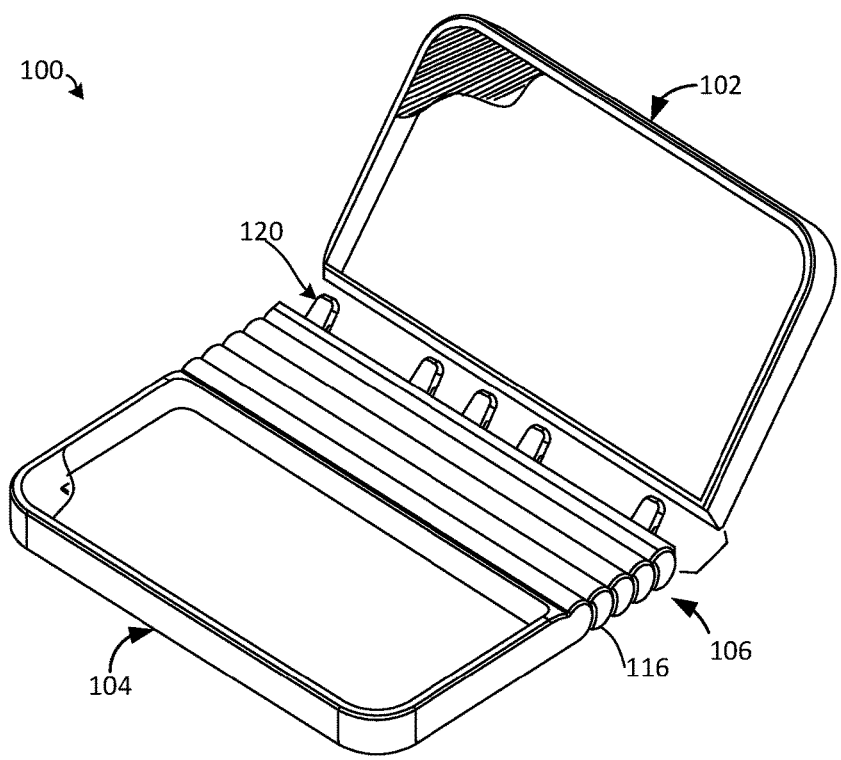

FIGS. 1A-1C collectively illustrate an example computing device (e.g., device) 100 that can include a first portion 102 and a second portion 104 rotatably secured together by a sequential multi-axis hinge assembly 106. In some examples, the first portion 102 may be a tablet device having a touch screen 108 (shown cut-away) and the second portion 104 may be an input device and/or include an input device 110 (shown cut-away).

In an example, the input device 110 can be a keyboard 112. Other implementations can employ other input devices, for instance, a touch screen can function as an input device (e.g., display a virtual keyboard). The device 100 can also include computing elements 114 (illustrated relative to FIG. 1B) such as a processor, memory/storage, a battery, and/or a video or graphics processor, among other components/elements. These computing elements may be positioned in the first portion 102 and/or second portion 104.

The sequential multi-axis hinge assembly 106 can include articulating hinge covers (e.g., hinge covers 116) that can obscure and/or protect the underlying elements. The hinge covers are removed starting at FIG. 2A to facilitate illustration of the underlying elements.

FIG. 1A shows the computing device 100 in a closed position or orientation from a "front" view of the computing device 100. In the closed orientation, each hinge of the sequential multi-axis hinge assembly 106 is rotated to its individual fully closed orientation to position the first portion 102 over the second portion 104. In an example shown in FIG. 1A, in the closed orientation, the second portion 104 can be configured to be positioned on a generally horizontal surface such as a table top, and the first and second portions 102 and 104 may be generally parallel to one another and the horizontal surface (e.g., the first portion 102 is juxtaposed over the second portion 104).

In the closed orientation, the first portion 102 and the second portion 104 may be at a rotational angle of approximately zero degrees relative to each other; however, this closed angle may be more or less depending on the particular hinge assembly implementation. For example, a device may have a closed angle of around negative two to negative five degrees.

FIG. 1B shows the computing device 100 in an open or deployed position. In the open position, the first portion 102 and the second portion 104 may be at an obtuse angle a relative to each other to enable interaction with the first portion 102.

Note that the mass of various components, such as computing elements 114 can affect the stability of the device in various orientations. For instance, computing elements 114(3), 114(4), and 114(5) can move the center of mass as the first and second portions are rotated from the closed orientation of FIG. 1A to the deployed or open orientation of FIG. 1B. To address this issue and avoid tipping, the sequential multi-axis hinge assembly 106 may provide a foot 118 in the deployed orientation that may increase the stability of the computing device 100 and/or reduce the likelihood of the computing device 100 tipping over backward in the deployed position from the mass of components in the first portion 102. The foot 118 can increase a footprint f of the device. For instance, compare the footprint $f_c$ in the closed orientation of FIG. 1A to the deployed footprint $f_d$ of FIG. 1B. Thus, the sequential nature of the sequential multi-axis hinge assembly 106 may create the foot 118 in the deployed position that can help stabilize the computing device 100 and decrease tipping (e.g., maintain the center of mass over the footprint).

FIG. 1C shows the computing device 100 in a detached state. In some examples, the sequential multi-axis hinge assembly 106 can be secured to the first portion 102 and the second portion 104 in a relatively permanent manner via a fastening component (e.g., in a manner that is not intended to be readily separable by an end user). Alternatively, the sequential multi-axis hinge assembly 106 can be secured to the first portion 102 and the second portion 104 in an attachable/detachable manner as shown in FIG. 1C.

In an example implementation, the sequential multi-axis hinge assembly 106 may include one or more protrusions 120, or fangs, configured to engage with one or more receptacles of the first portion 102 to attach the sequential multi-axis hinge assembly 106 to the first portion 102. The protrusions 120 may be configured to engage with receptacles (not shown) of the first portion 102 via a latch mechanism or via a magnetic mechanism enabling a quick and easy attach/detach mechanism for an end user. Other attach/detach assemblies may also be contemplated. Similarly, the sequential multi-axis hinge assembly 106 may attach to the second portion 104 by similar permanent or detachable means as described above.

Alternatively, or additionally to the mechanical coupling described above, the quick attach/detach assembly can enable electronic components of the first portion 102 and the second portion 104 to attach and detach in order to electrically couple processor, storage/memory, and/or battery from the first portion 102 to the graphics processor and/or keyboard in the second portion 104, for example.

Thus, the quick attach/detach assembly can allow the user to be able to detach the first portion 102 or the second portion 104 to use either portion independent of the other. For example, the first portion 102 may be operated as a stand-alone tablet device, and then may be attached to second portion 104, via sequential multi-axis hinge assembly 106, allowing the computing device 100 to function similar to a laptop device. Additionally, a user may also be able to exchange the first portion 102 or the second portion 104 for application-specific devices. For example, an individual second portion 104 may include a keyboard and/or a touchscreen. In certain scenarios, the user may attach a first touchscreen as the first portion 102 and a second touchscreen as the second portion 104, and utilize the computing device 100 like a book. In other scenarios, the user may attach a touchscreen as the first portion 102 and an input device, manifest as a keyboard and trackpad, as the second portion 104, and utilize the computing device 100 like a laptop. Other configurations and implementations may be contemplated.

Figure 2A:
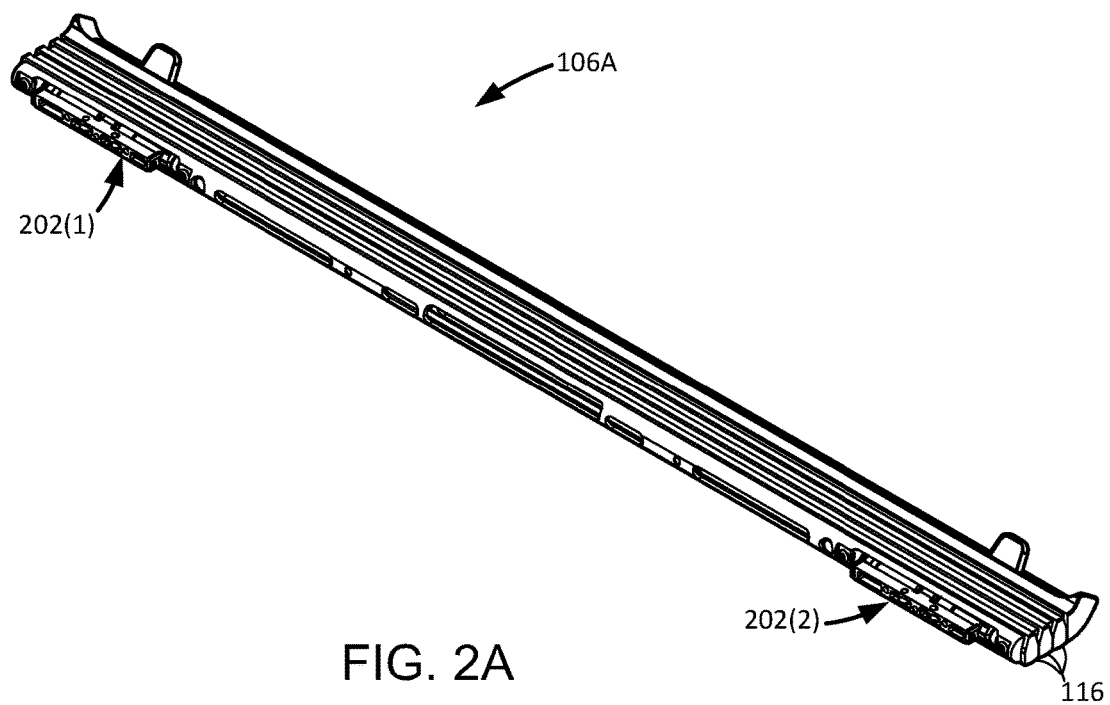
FIGS. 2A-2D illustrate assembled and exploded views of an example sequential multi-axis hinge assembly in accordance with some implementations.
Figure 2B:
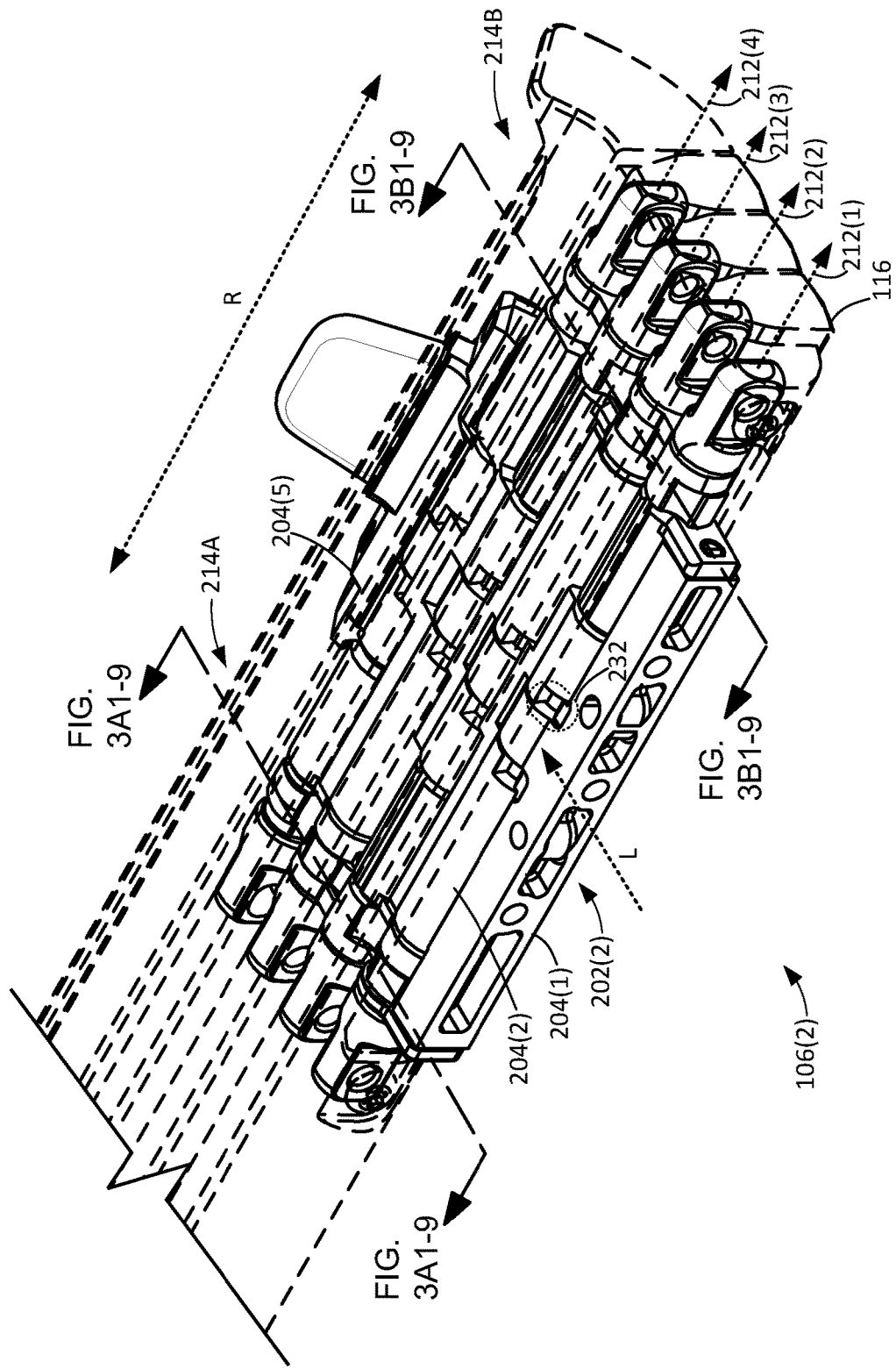
Figure 2C:
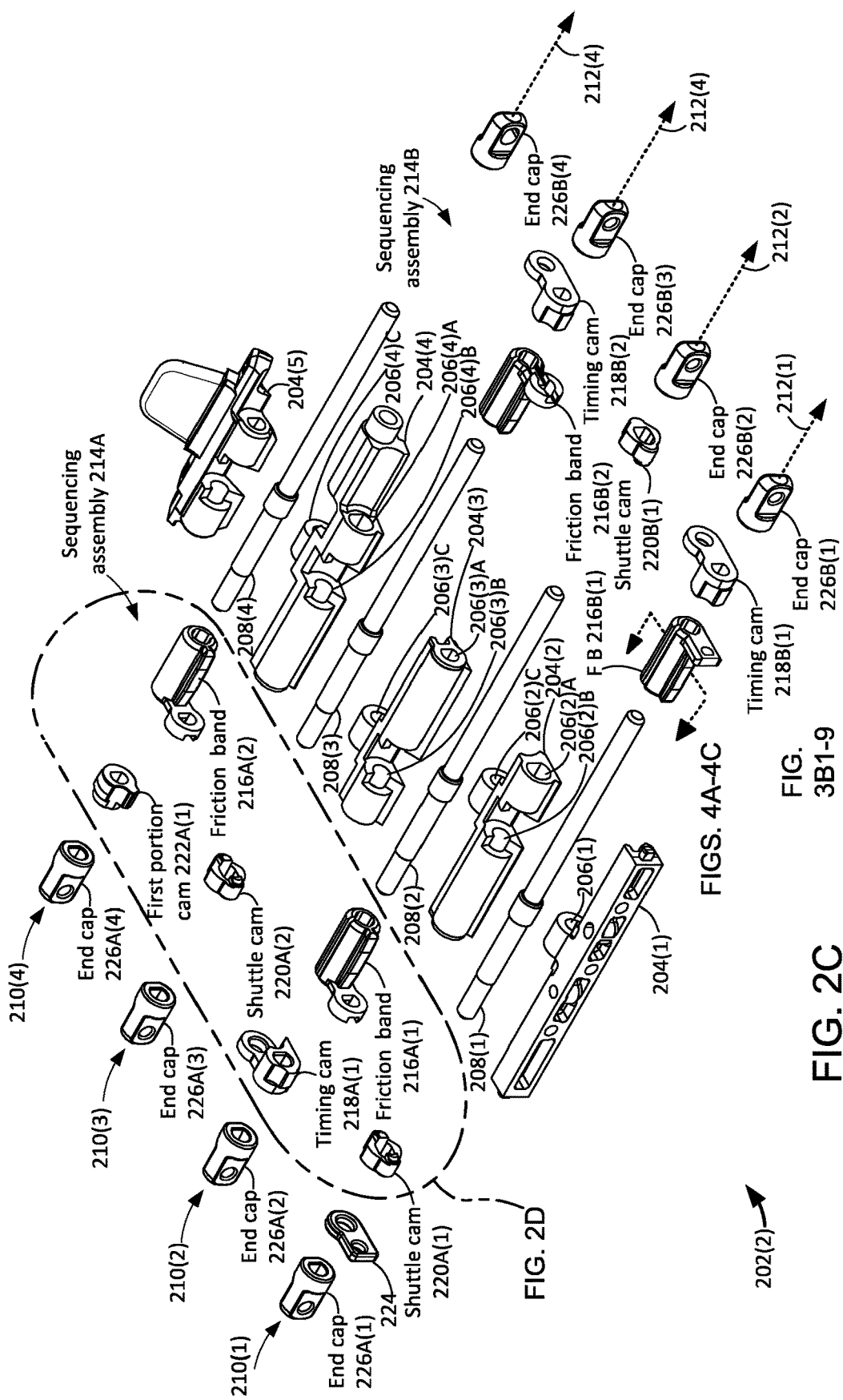

FIGS. 2A-2C collectively show another example sequential multi-axis hinge assembly 106A. In this case, the sequential multi-axis hinge assembly 106A includes a pair of hinge sets 202 that are spaced apart and covered by hinge covers 116 (shown in FIG. 2A, shown in ghost in FIG. 2B, removed in FIG. 2C). Individual hinge sets 202 can include multiple hinge frames 204. (Note that due to space constraints on the drawing pages, not all elements are labeled in each figure, and not every instance of every element is labeled, rather representative elements are labeled.) Individual hinge frames 204 can define shaft enclosures 206 that can receive hinge shafts or hinge pins 208. Individual shaft enclosures 206 can be aligned with shaft enclosures 206 of adjacent hinge frames 204 to receive a hinge shaft and form a hinge 210 that rotates around a hinge axis 212 defined by the hinge shaft 208. For instance, shaft enclosure 206(1) of hinge frame 204(1) fits between shaft enclosures 206(2)A and 206(2)B of hinge frame 204(2) to receive hinge shaft 208(1) to form hinge 210(1). Similarly, shaft enclosure 206(2)C of hinge frame 204(2) fits between shaft enclosures 206(3)A and 206(3)B of hinge frame 204(3) to receive hinge shaft 208(2) to form hinge 210(2). The sequential multi-axis hinge assembly 106A can also include sequencing assemblies 214 that can control the relative order that rotation occurs around individual hinge axes 212 under specific conditions, such as opening or closing. In this example the sequencing assemblies 214 can include friction band 216, timing cam 218, shuttle cam 220, first portion timing cam 222, spacer 224, and/or end caps 226.

Figure 2D:
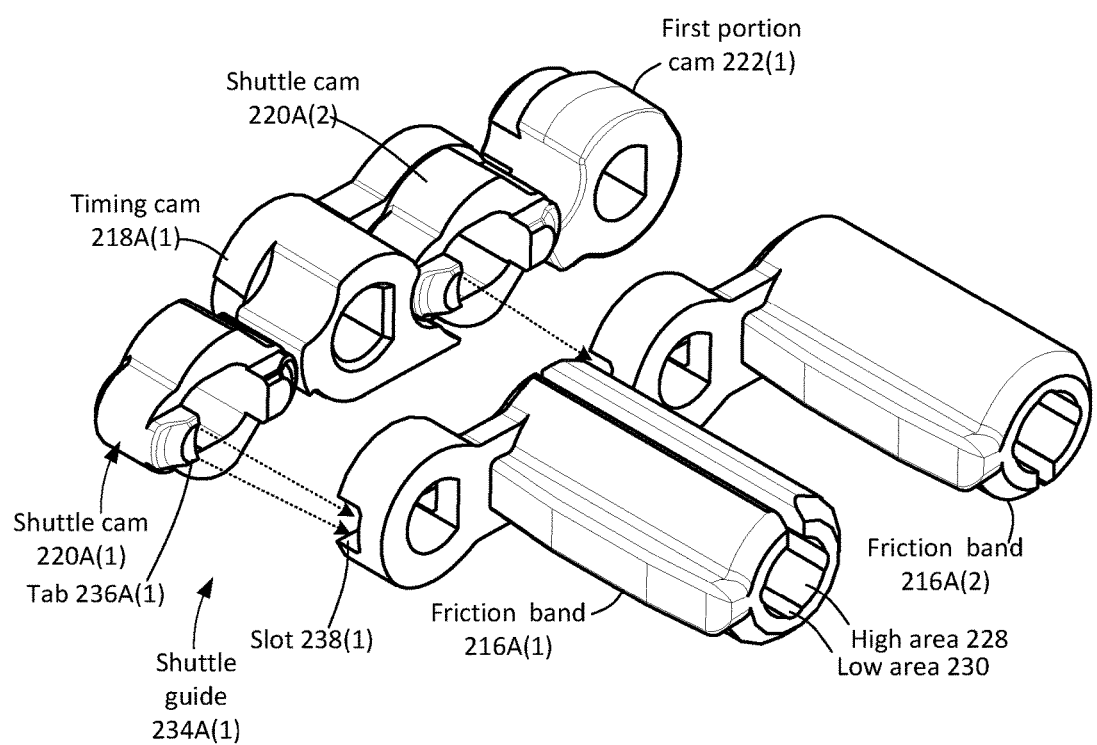

Friction bands 216 can be secured to respective hinge frames 204. The hinge shafts 208 can pass through respective friction bands and the friction bands can provide resistance to rotation of the hinge shafts. Stated another way, the friction bands can function as a friction interface between the hinge frames to provide an arresting force for the attached device. That is, the friction bands 216 may be undersized relative to a hinge shaft diameter, and the hinge shaft 208 may cause the friction band 216 to expand when the friction band 216 is inserted over the hinge shaft 208. An amount of friction may be adjusted by factors such as a thickness and length of the friction band 216, the diameter of the hinge shaft 208, a type of grease used, and/or other known friction technologies. Various types of friction bands 216 may be contemplated. Further, in some implementations the friction bands can supply a uniform friction force (e.g., resistance) to the hinge shaft for the range of rotation of the hinge shaft. In other implementations, the friction bands can supply a non-uniform resistance (e.g., varying friction force). For instance, with a hinge shaft that has a range of rotation of 30 degrees, the friction force could be greater from zero degrees to 10 degrees than from 10 degrees to 30 degrees. One such example can be seen in FIG. 2D where the friction band 216A(1) has both high areas 228 and low areas 230. The high and low areas can bias the hinge shaft toward specific orientations. For instance, features on the outwardly facing surface of the hinge shaft 208 could be biased toward the low areas because less friction is encountered at the low areas compared to the high areas. Further, in some implementations, the friction force can be the same in both directions of rotation. In other implementations, the friction force can be different for opening rotation than for closing rotation. For instance, the friction force could be lower for opening rotation (e.g., when the user opens a device that is in the closed orientation) and relatively higher for closing rotation (e.g., when the user closes a device in the open or deployed orientation). A further example that illustrates these aspects is shown and described below relative to FIGS. 4A-4C.

As mentioned, sequencing assemblies 214 can control the relative order of rotation around the hinge axes 212. The sequencing assemblies 214 can also control an extent of rotation (e.g., number of degrees or radians of rotation) around individual hinge axes 212. In this case, the extent of rotation can be controlled by interactions of adjacent hinge frames 204. For instance, FIG. 2B shows how the interaction of hinge frame 204(1) with hinge frame 204(2) can define an angle of rotation or range of rotation 232 around hinge axis 212(1). The angle of rotation around the individual hinge axes can collectively define the angle of rotation of the sequential multi-axis hinge assembly 106A.

The sequential multi-axis hinge assembly 106A can also include shuttle guides 234 (FIG. 2D) that can prevent rotation of the shuttle cam 220 around the corresponding hinge shaft 208 while allowing the shuttle cam to move orthogonally to the hinge shaft 208. In this example, the shuttle guides are implemented as tabs or rails 236 that ride or slide in slots 238. In this case, the rails 236 are formed on the shuttle cams 220 and the slots 238 are formed in the friction bands 216. However, other configurations are contemplated. For instance, the rails could be formed in the friction bands and the slots could be formed in the shuttle cams, for example.

FIGS. 3A-1 through 3A-9 and FIGS. 3B-1 through 3B-9 collectively show how sequencing assemblies 214A and 214B, respectively, can collectively control the rotation sequence of sequential multi-axis hinge assembly 106A. FIGS. 3A-1 through 3A-9 show views through shuttle cam 220A(1), timing cam 218A(1), shuttle cam 220A(2), and first portion cam 222A(1). FIGS. 3B-1 through 3B-9 show views through timing cam 218B(1), shuttle cam 220B(1), and timing cam 218B(2).

Figures 1, 3A:
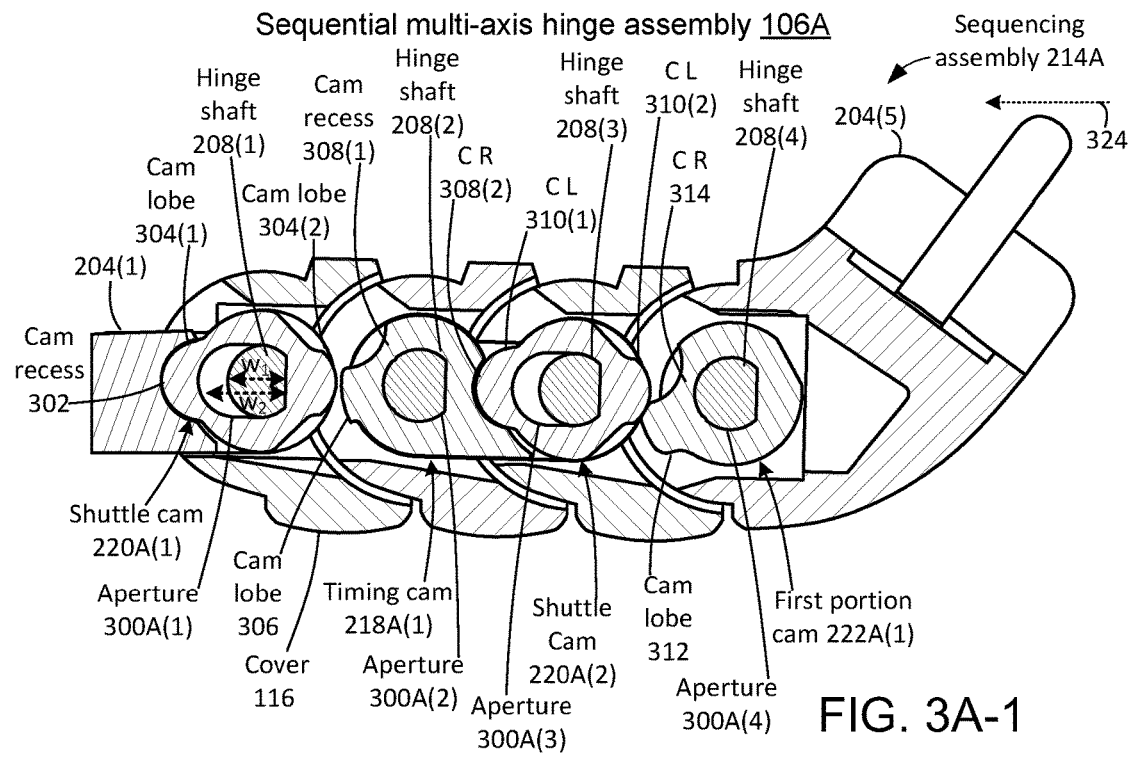
FIGS. 3A-1 through 3B-9 illustrate cross sectional views of an example sequential multi-axis hinge assembly in closing and opening scenarios in accordance with some implementations.

Looking at FIG. 3A-1, shuttle cam 220A(1), timing cam 218A(1), shuttle cam 220A(2), and first portion cam 222A (1) each define an aperture 300A through which the respective hinge shafts 208 extend. Further, hinge frame 204(1) defines a cam recess 302 and shuttle cam 220A(1) defines cam lobes 304(1) and 304(2). The timing cam 218A(1) defines cam lobe 306 and cam recesses 308(1) and 308(2). Shuttle cam 220A(2) defines cam lobes 310(1) and 310(2) and first portion cam 222A(1) defines cam lobe 312 and cam recess 314. To avoid clutter on the drawing pages not all of these elements are specifically designated in each of FIGS. 3A-2 through 3A-9.

Figures 1, 3B:
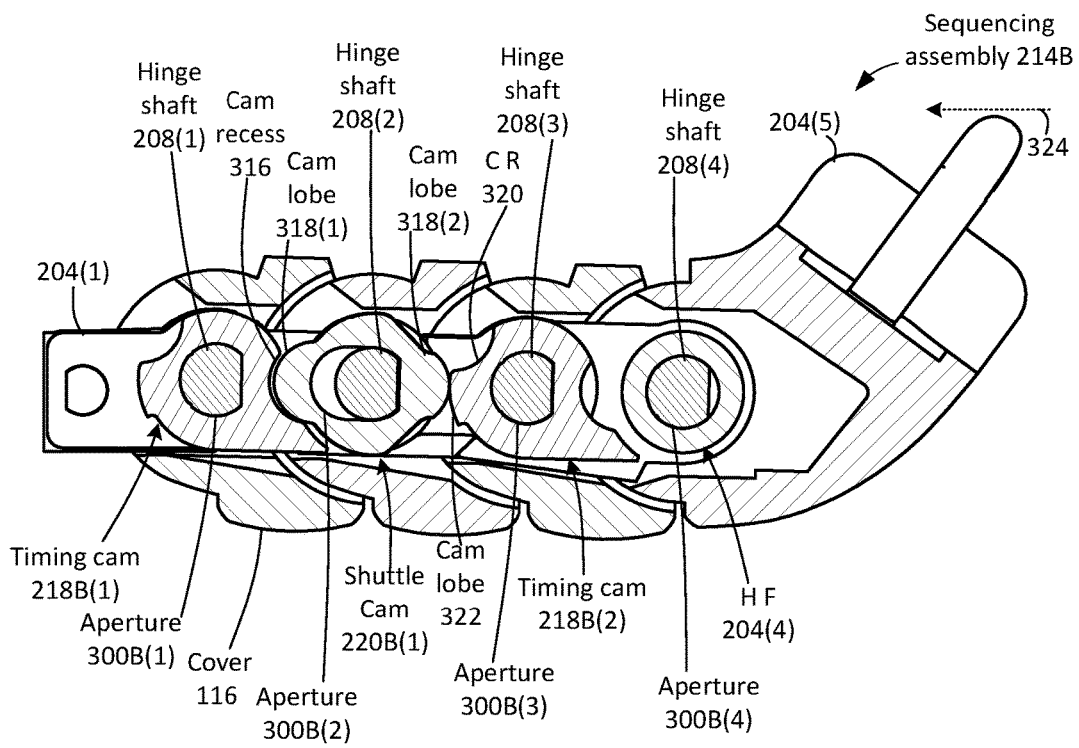

Looking at FIG. 3B-1, timing cam 218B(1), shuttle cam 220B(1), timing cam 218B(2) and hinge frame 204(4) can each define apertures 300B through which the respective hinge shafts 208 extend. Timing cam 218B(1) can define a cam recess 316. (In the illustrated implementation, all of the timing cams can have the same profile to reduce the number of different elements in the device. As such, timing cam 218B(1) can also define another cam recess and a cam lobe which are shown but not designated). Shuttle cam 220B(1) can define cam lobes 318(1) and 318(2). Timing cam 218B (2) can define cam recess 320 as well as cam lobe 322 (and another shown but not designated cam recess).

Looking at FIGS. 3A-1 and 3B-1, in this implementation, the hinge shafts 208 have a keyed configuration. In this example, the hinge shafts are keyable in that the hinge shafts have a "D" shaped configuration when viewed orthogonal to the hinge axis 212. The cams can have a corresponding "D" shaped aperture to prevent rotation of the cams around the respective hinge shaft. For instance, hinge shaft 208(1) is "D" shaped and aperture 300B(1) of timing cam 218B(1) is "D" shaped so that the hinge shaft and the timing cam rotate together. Other key shapes are contemplated. For instance, the hinge shafts could have a star shaped configuration that matches star shaped apertures. Note further, that shuttle cams 220A(1), 220A(2), and 220B(1) have elongate apertures 300A(1), 300A(2), and 300B(2). The elongate apertures allow the shuttle cams to move orthogonally relative to the hinge shafts 208(1), 208(2), and/or 208(3). For instance, as labeled relative to shuttle cam 220A(1), a width of hinge shaft 208(1) is indicated as $w_1$ and a width of aperture 300A(1) in the shuttle cam is indicated as $w_2$. A different between the width of the aperture and the width of the hinge shaft ($w_2$-$w_1$) can define an extent of lateral movement of the shuttle cam relative to the hinge shaft. This aspect works cooperatively with the shuttle guide (234A(1), FIG. 2D) to define movement of the shuttle cam. Recall that the discussion above relative to FIG. 2D explained how the shuttle cams can move orthogonally on the rails and slots, but cannot rotate.

Functional aspects of how sequencing assemblies 214A and 214B can control the sequence of rotation of the sequential multi-axis hinge assembly 106A are now explained starting with FIGS. 3A-1 and 3B-1. These FIGS. show the sequential multi-axis hinge assembly 106A in the fully open or deployed position similar to FIG. 1B. Assume for purposes of explanation that a user is applying a force as indicated by arrow 324 to close the device similar to FIG. 1A. Looking at sequencing assembly 214A, rotation around hinge shaft 208(1) is blocked by shuttle cam 220A(1). In this instance, the shuttle cam's cam lobe 304(1) is engaged in cam recess 302 on the hinge frame 204(1). The shuttle cam 220A(1) is blocked from moving laterally (e.g., orthogonally to the hinge axis) by cam lobe 304(2) engaging cam lobe 306 of timing cam 218A(1).

Sequencing assembly 214B blocks rotation around hinge shaft 208(2). The hinge shaft 208(2) passes through shuttle cam 220B(1). This shuttle cam 220B(1) is blocked from rotation by cam lobe 318(1) engaging cam recess 316 in timing cam 218B(1). Further, the shuttle cam 220B(1) cannot move laterally away from timing cam 218B(1) because cam lobe 318(2) is engaging cam lobe 322 of timing cam 218B(2). Returning to sequencing assembly 214A, shuttle cam 220A(2) and hence hinge shaft 208(3) cannot rotate. Specifically, cam lobe 310(1) of shuttle cam 220A(2) is engaging cam recess 308(2) of timing cam 218A(1). The shuttle cam 220A(2) cannot move away from timing cam 218A(1). Thus, counter-clockwise rotation responsive to force 324 can only occur at hinge shaft 208(4).

Figures 2, 3A:
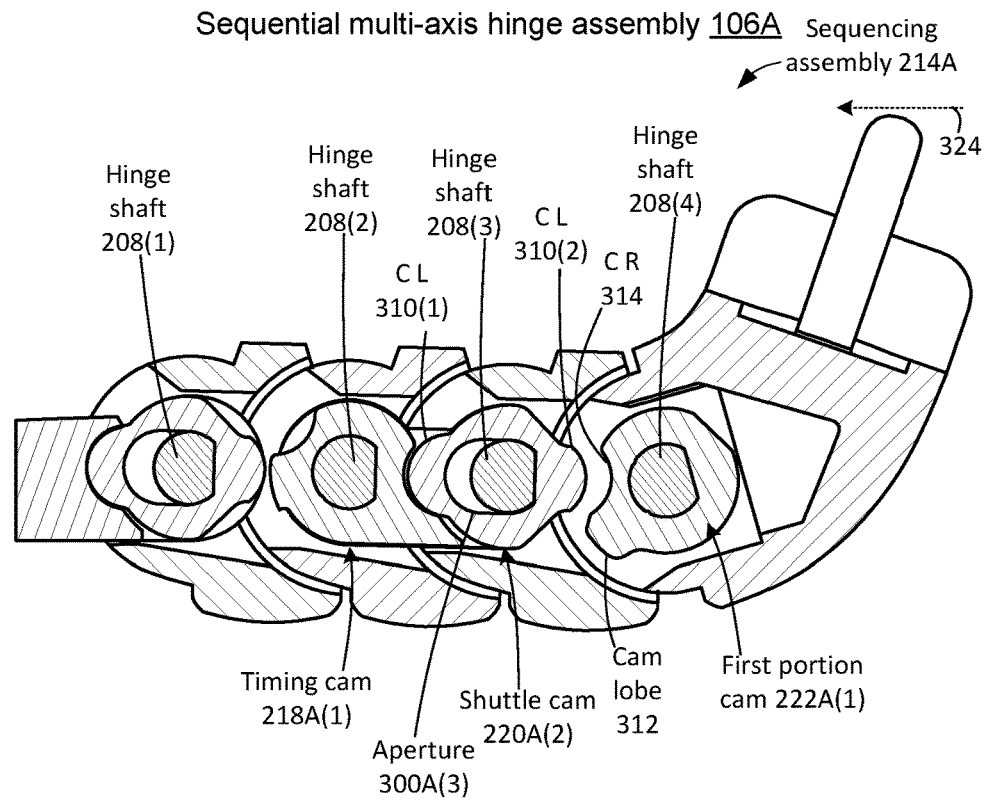
Figures 2, 3B:
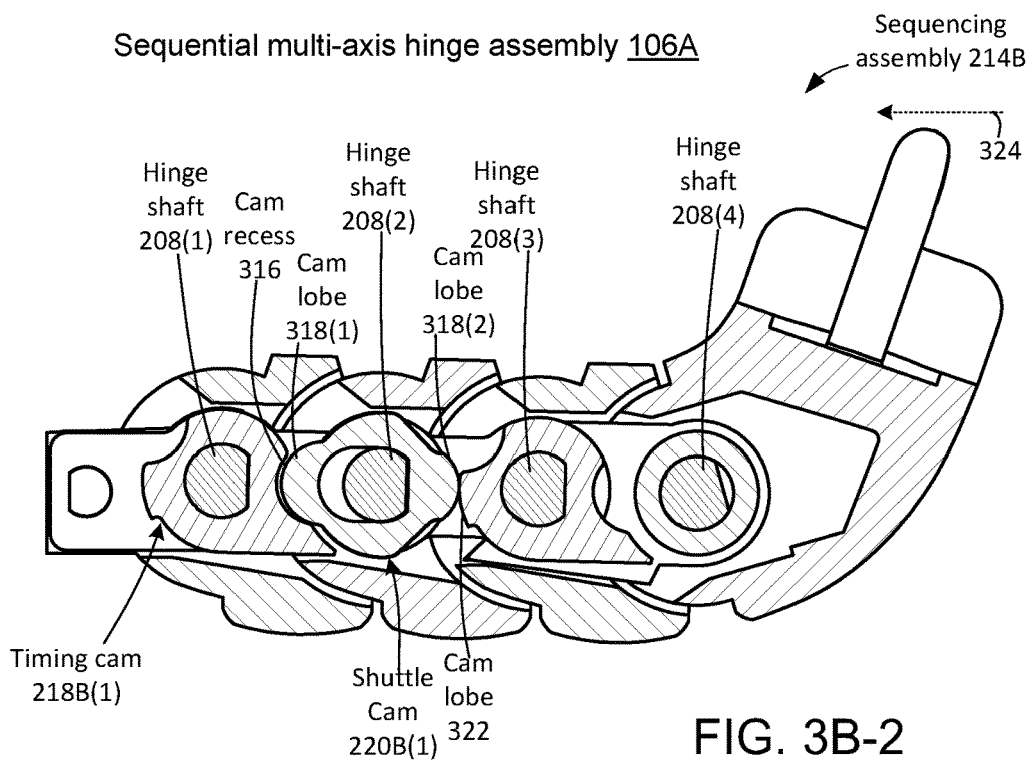

FIGS. 3A-2 and 3B-2 show sequential multi-axis hinge assembly 106A after about thirty degrees of rotation around hinge shaft 208(4). At this point, rotation around hinge shaft 208(4) can be stopped by contact between adjacent hinge frames as shown at 232 of FIG. 2B. Note however, in relation to sequencing assembly 214A, that cam lobe 312 of first portion cam 222A(1) is no longer opposing cam lobe 310(2) of shuttle cam 220A(2). Instead, cam recess 314 is aligned with cam lobe 310(2). As such, shuttle cam 220A(2) is free to move laterally toward first portion cam 222A(1) and away from timing cam 218A(1). The movement can occur because of the elongate shape of aperture 300A(3) relative to hinge shaft 208(3). Rotation around hinge shafts 208(1) and 208(2) remains blocked for the reasons described above relative to FIGS. 3A-1 and 3B-1. Relative to hinge shaft 208(2), shuttle cam 220B(1) is blocked from rotation by cam lobe 318(1) engaging cam recess 316 in timing cam 218B(1). Further, the shuttle cam 220B(1) cannot move laterally away from timing cam 218B(1) because cam lobe 318(2) is engaging cam lobe 322 of timing cam 218B(2).

Figures 3, 3A:
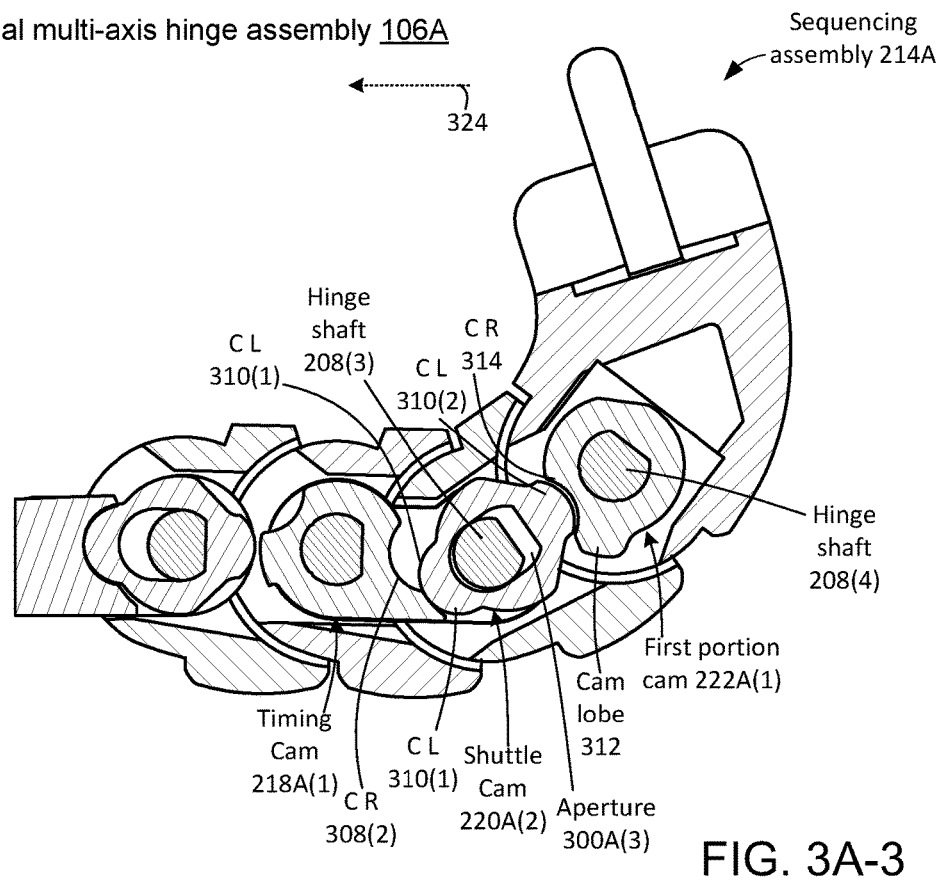
Figures 3, 3B:
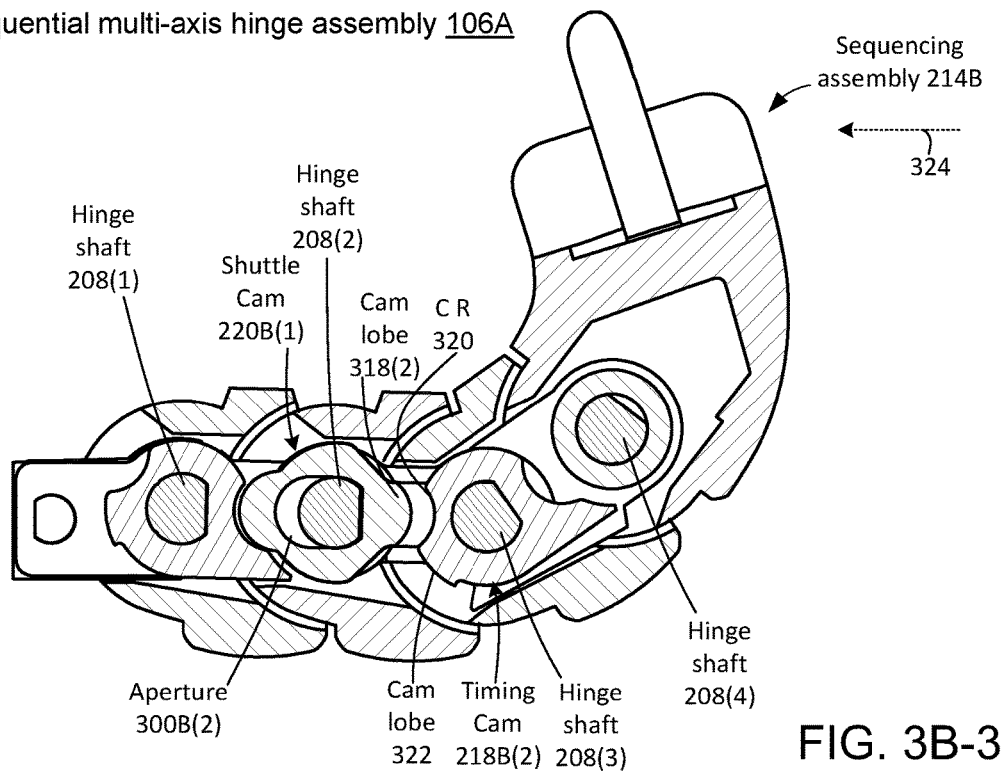
Figures 3, 3A, 4:
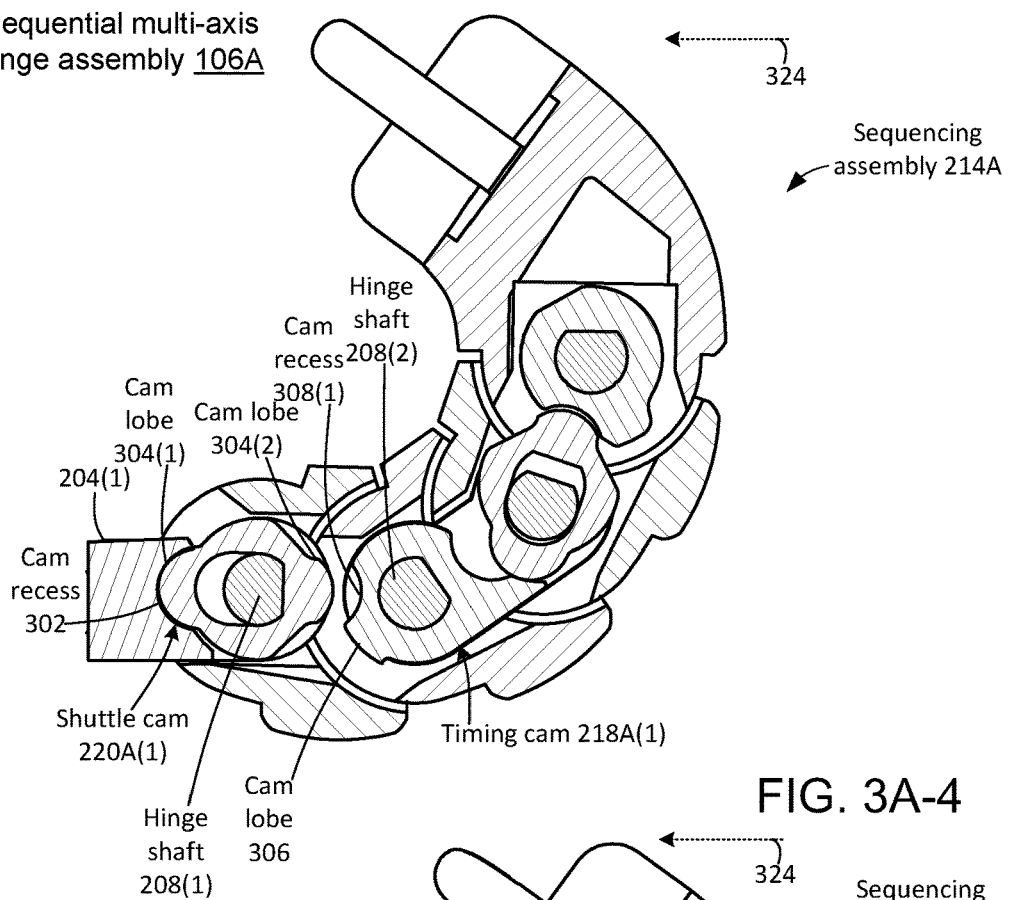
Figures 3, 3B, 4:
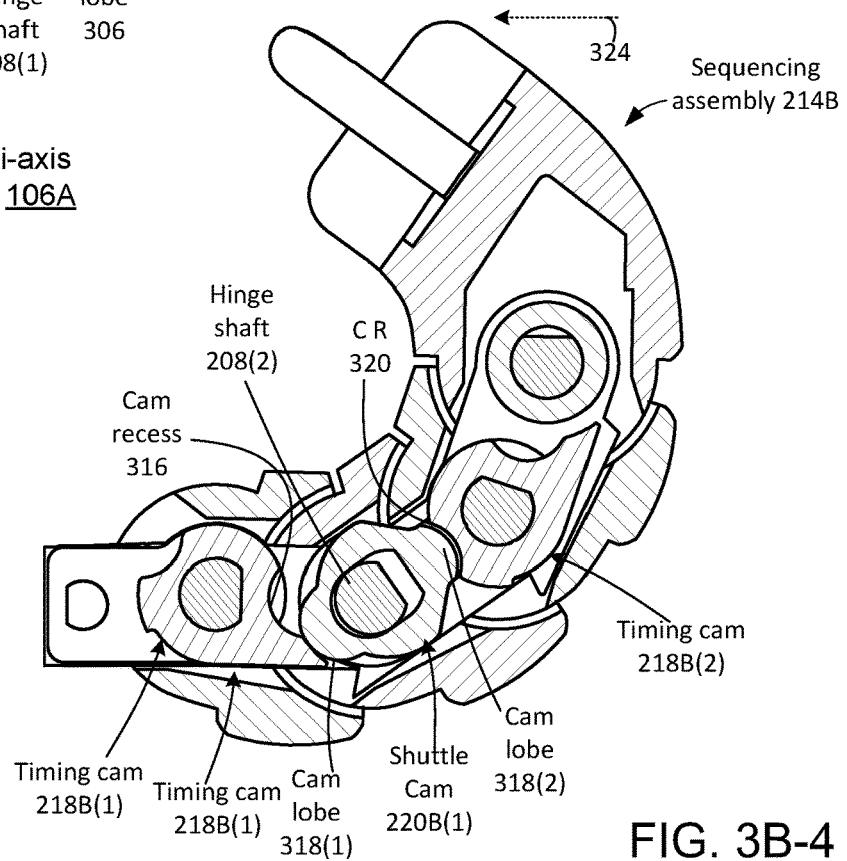
Figures 3, 3A, 4, 5:
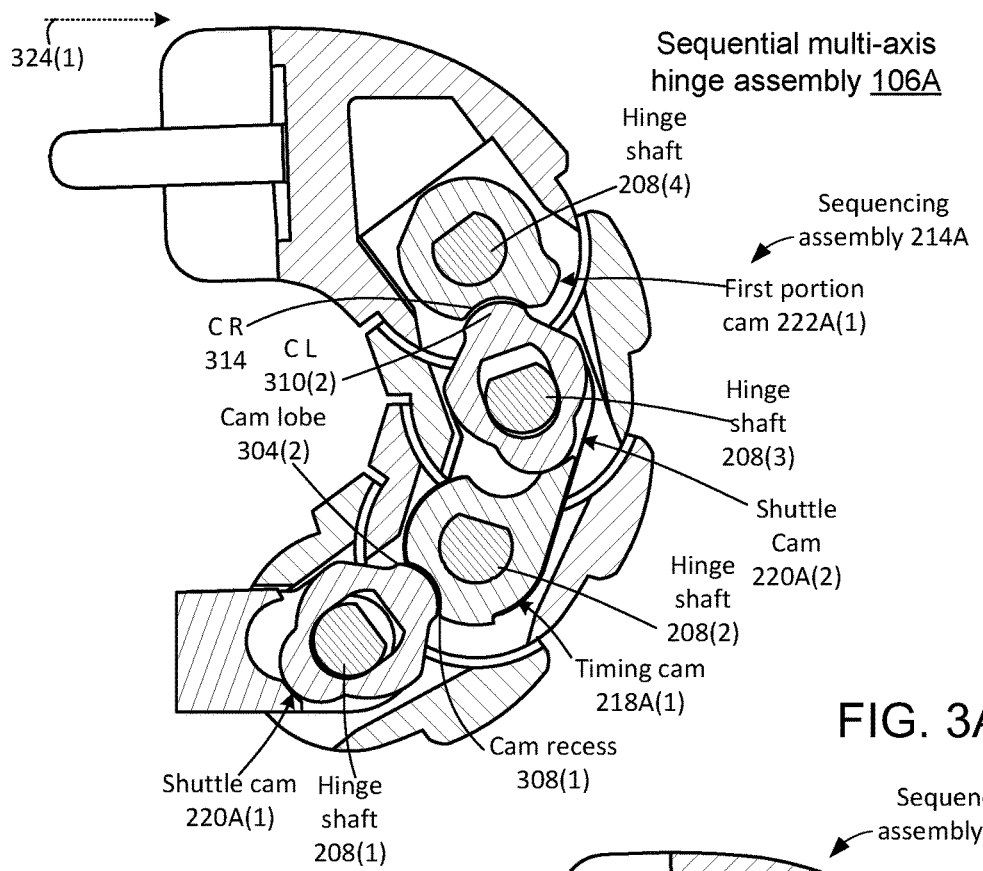
Figures 3, 3B, 4, 5:
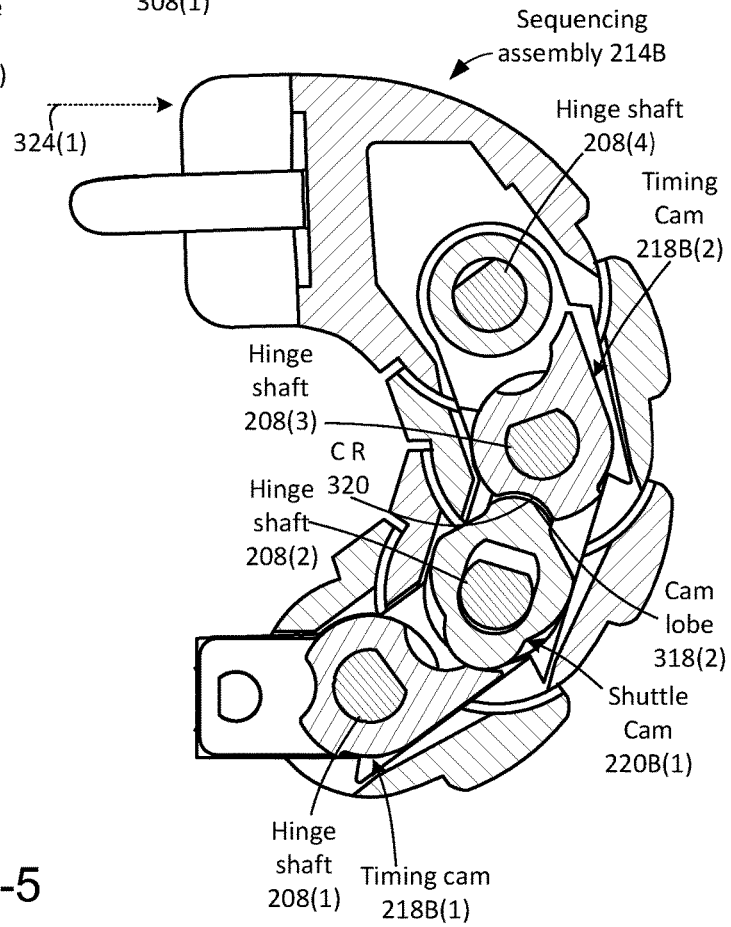
Figures 3, 3A, 4, 5, 6:
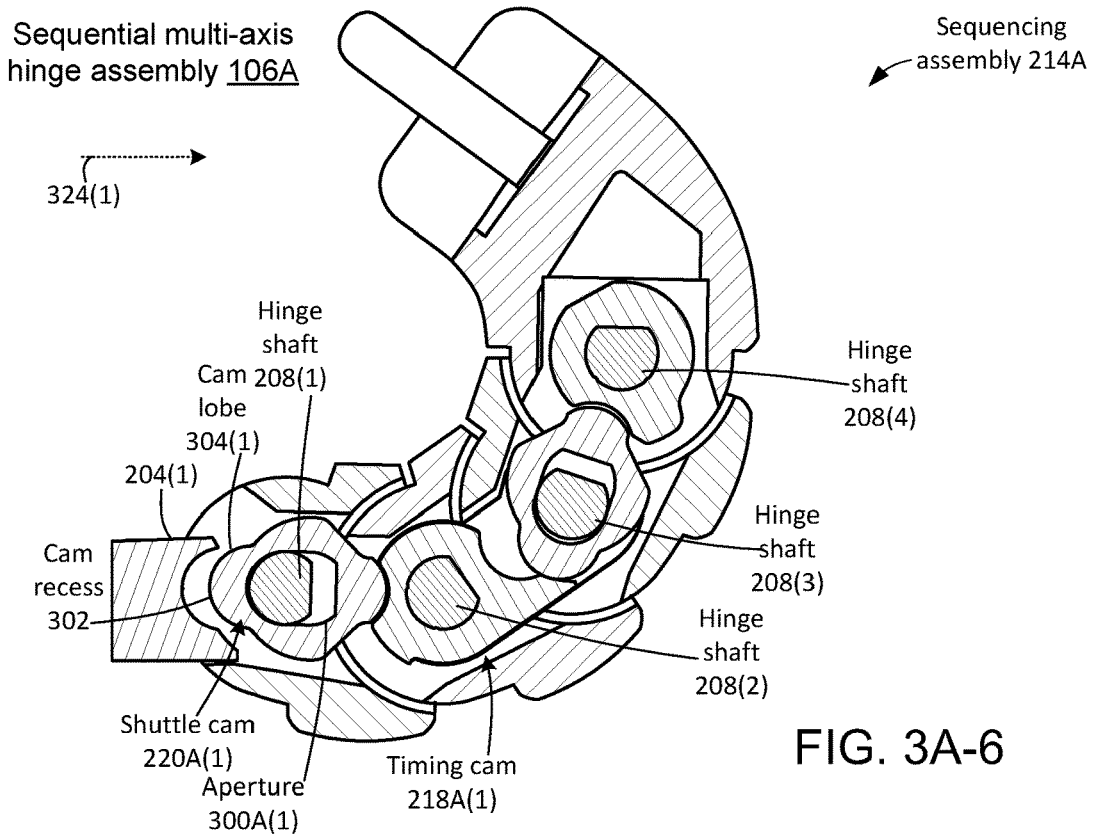
Figures 3, 3B, 4, 5, 6:
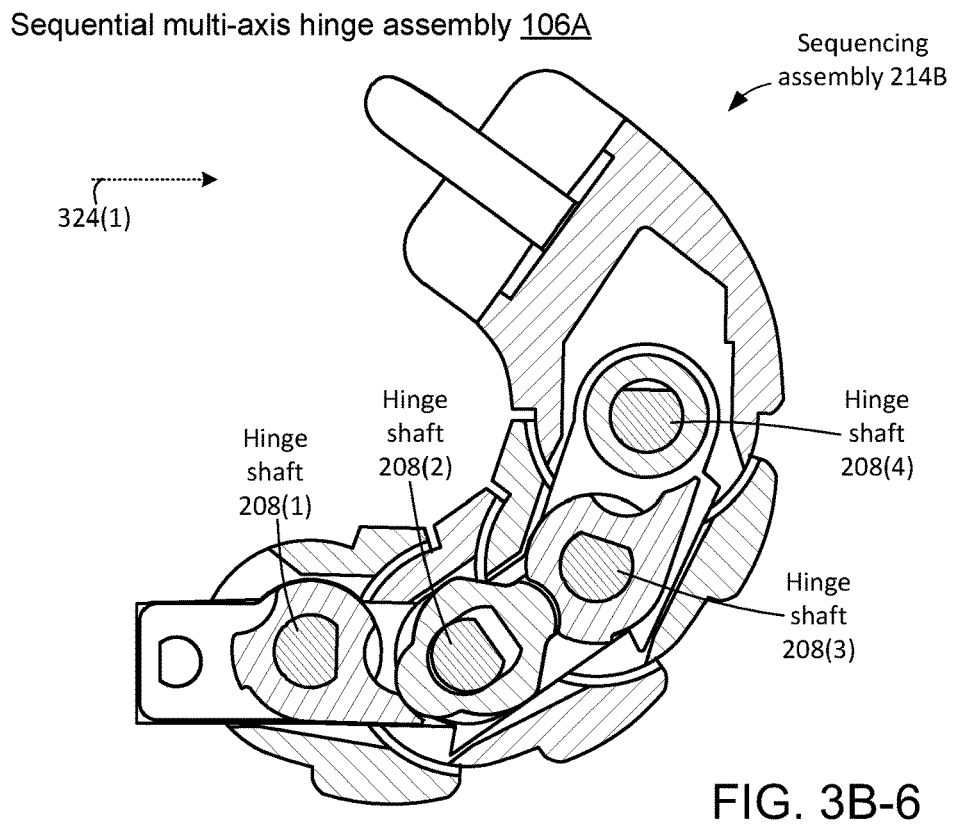
Figures 3, 3A, 4, 5, 6, 7:
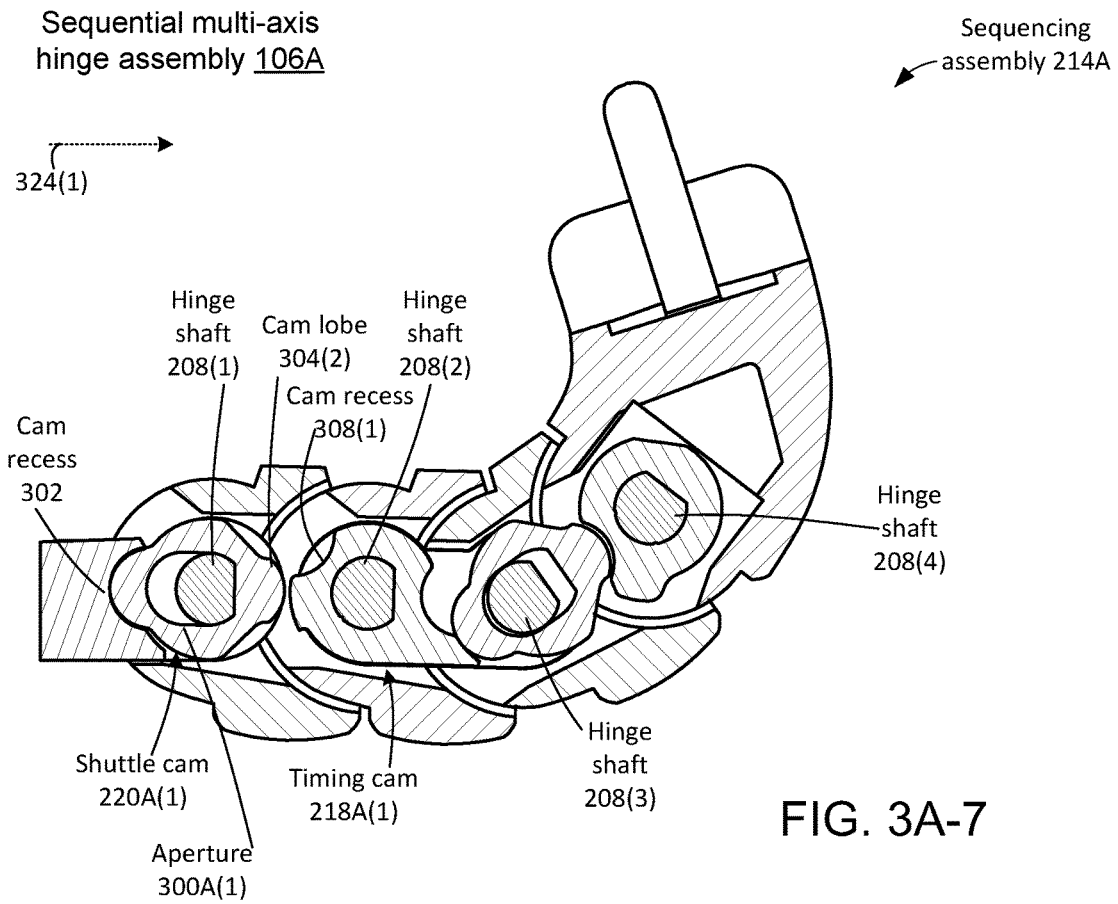
Figures 3, 3B, 4, 5, 6, 7:
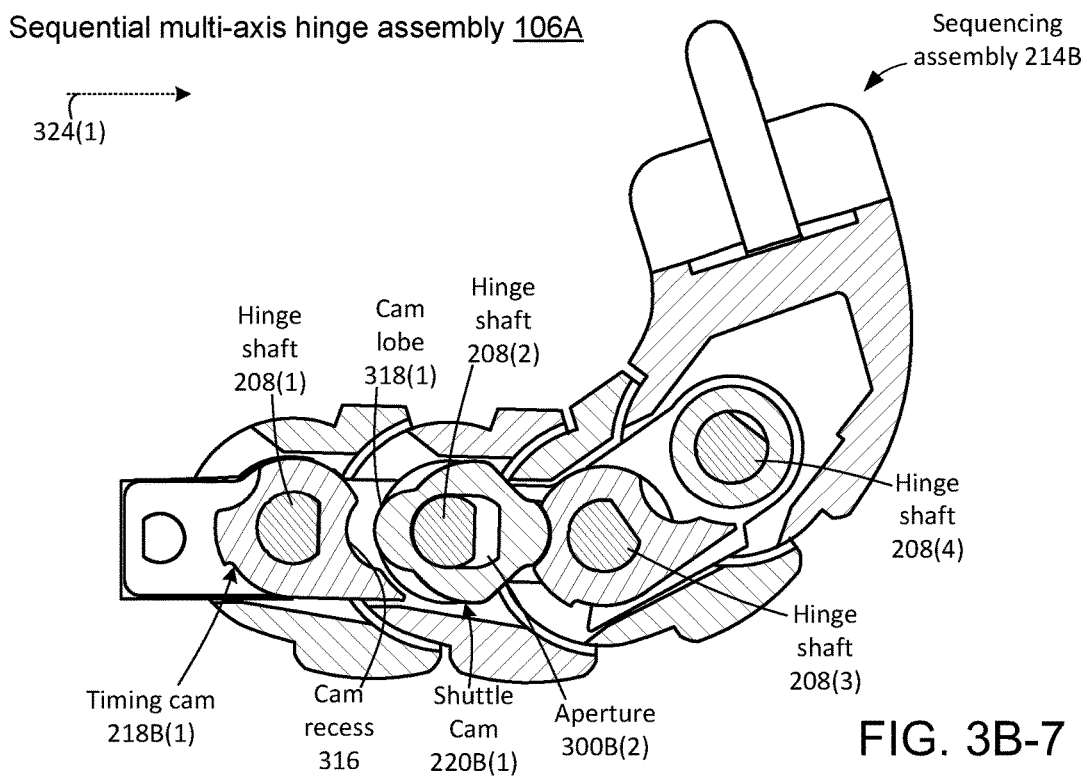
Figures 3, 3A, 4, 5, 6, 7, 8:
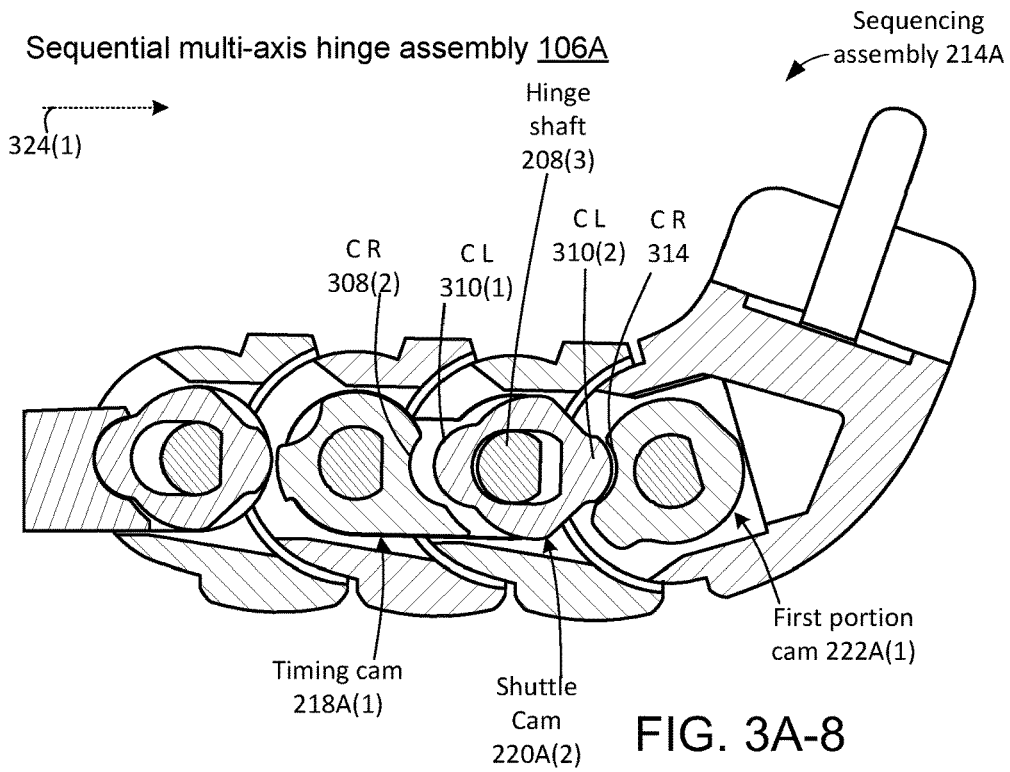
Figures 3, 3B, 4, 5, 6, 7, 8:
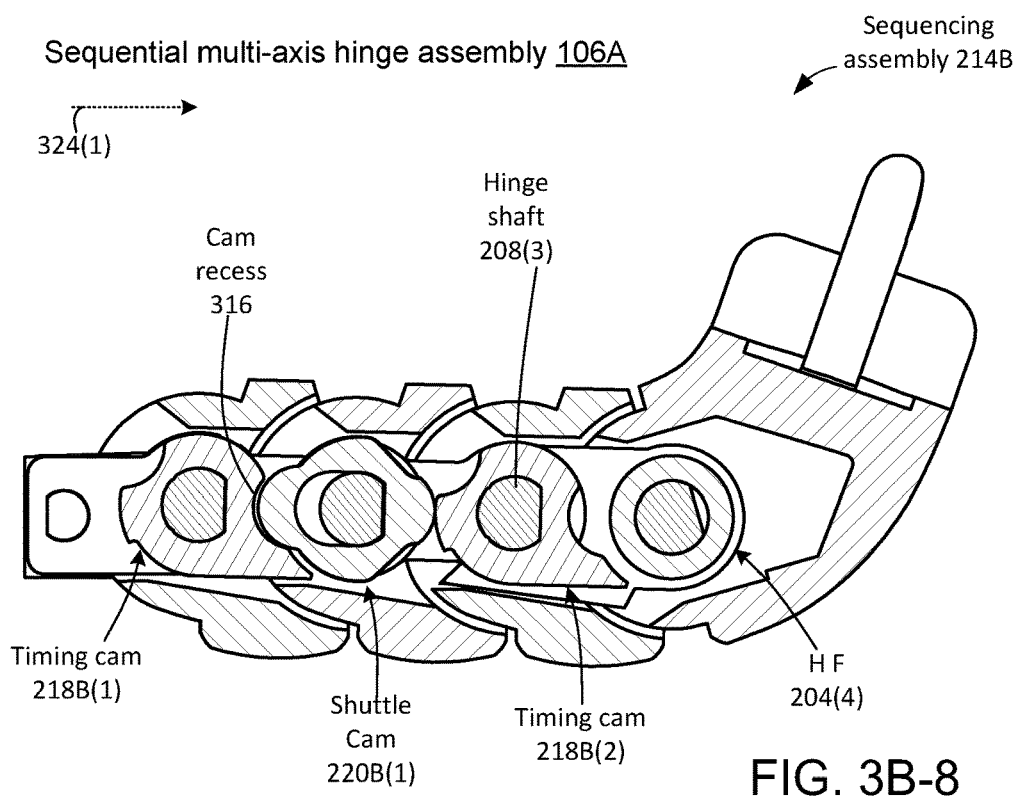
Figures 3, 3A, 4, 5, 6, 7, 8, 9:
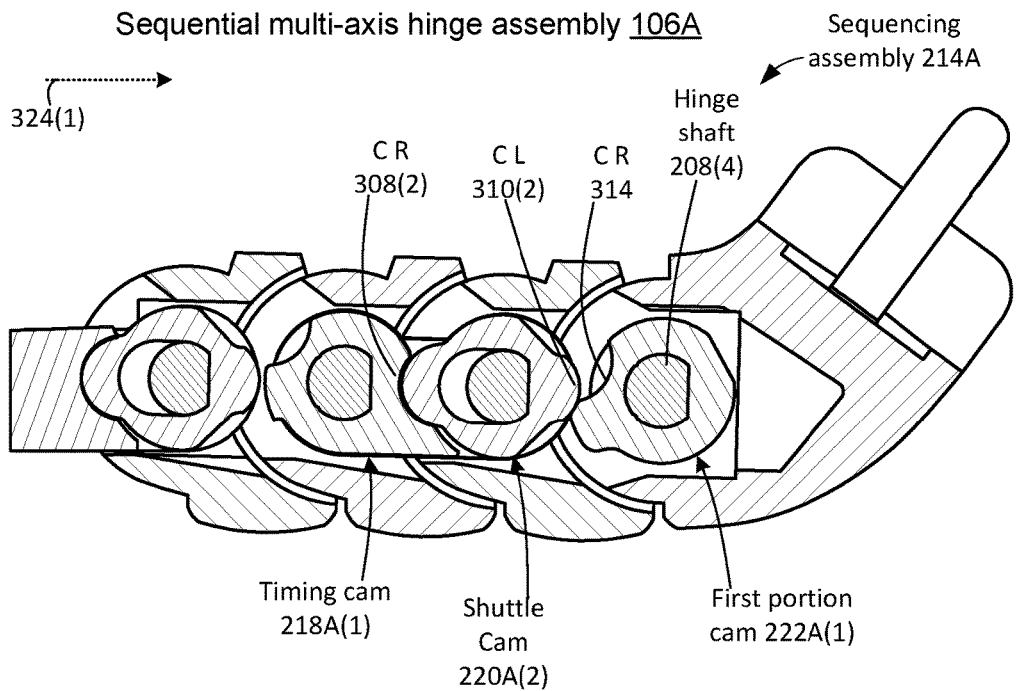
Figures 3, 3B, 4, 5, 6, 7, 8, 9:
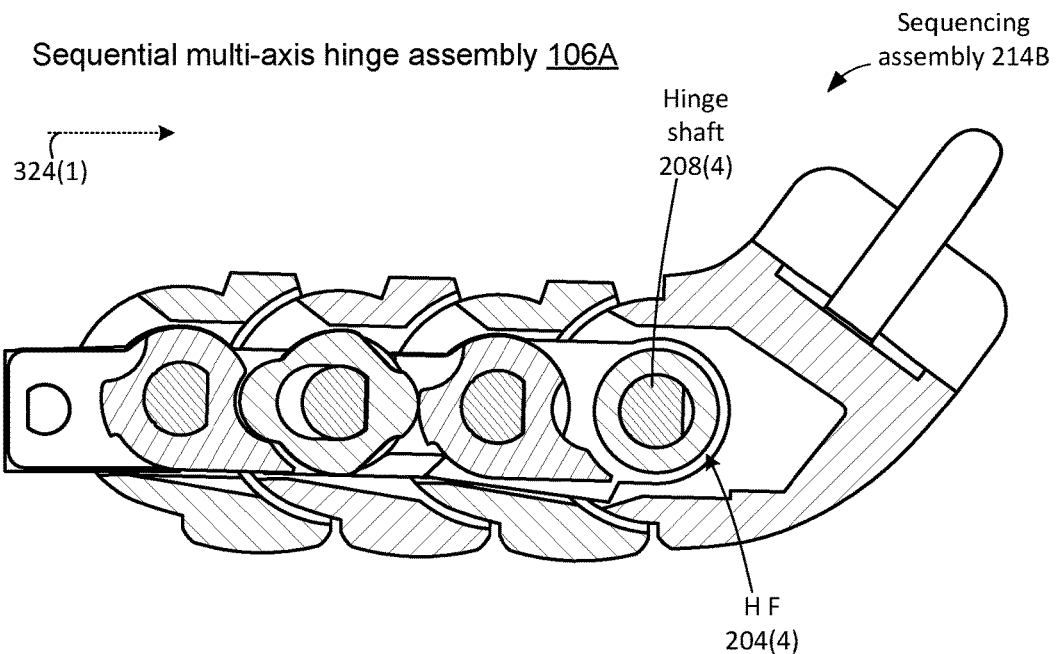

FIGS. 3A-3 and 3B-3 show a subsequent instance where shuttle cam 220A(2) has moved laterally toward first portion cam 222A(1) and away from timing cam 218A(1). The sequential multi-axis hinge assembly 106A (e.g., shuttle cam 220A(2)) is now able to rotate counter-clockwise around or with hinge shaft 208(3). Note that this rotation of shuttle cam 220A(2) rotates the shuttle cam's cam lobe 310(1) away from the cam recess 308(2) of timing cam 218A(1) in sequencing assembly 214A. Further, in sequencing assembly 214B, the counter-clockwise rotation around hinge shaft 208(3) rotates cam lobe 322 of timing cam 218B(2) away from cam lobe 318(2) of shuttle cam 220B(1). Now cam recess 320 of timing cam 218B(2) is proximate to cam lobe 318(2) of shuttle cam 220B(1). Thus, at this point shuttle cam 220B(1) is now free to move laterally (e.g., left to right on the drawing page) relative to hinge shaft 208(2).

FIGS. 3A-4 and 3B-4 show a subsequent instance where in sequencing assembly 214B the shuttle cam 220B(1) has moved laterally on hinge shaft 208(2) toward timing cam 218B(2) and away from timing cam 218B(1). The shuttle cam's cam lobe 318(2) is now engaging the timing cam's cam recess 320 and cam lobe 318(1) has vacated cam recess 316 and as such, the shuttle cam 220B(1) and hinge shaft 208(2) are able to rotate counter-clockwise. Note that this rotation of hinge shaft 208(2) also rotates timing cam 218A(1) of sequencing assembly 214A. Recall by comparing FIG. 3A-3 to FIG. 3A-4 that prior to this rotation, shuttle cam 220A(1) was blocked from rotation because cam lobe 306 of timing cam 218A(1) kept the shuttle cam's cam lobe 304(1) engaged with cam recess 302 in hinge frame 204(1). Now with the rotation of timing cam 218A(1) cam recess

308(1) is now aligned with cam lobe 304(2), which allows the shuttle cam 220A(1) to be able to move laterally relative to hinge shaft 208(1).

FIGS. 3A-5 and 3B-5 show a subsequent point where shuttle cam 220A(1) has moved laterally to the right on hinge shaft 208(1) to allow counter-clockwise rotation of hinge shaft 208(1), shuttle cam 220A(1), and timing cam 218B(1). At this point, rotation around each of the hinge shafts 208 in the counter-clockwise direction is complete and the sequential multi-axis hinge assembly 106A is in the closed position.

Assume at this point, the user wants to open the device and applies a force 324(1) to open the sequential multi-axis hinge assembly 106A. Shuttle cam 220A(1), timing cam 218B(1), and hinge shaft 208(1) are free to rotate clockwise. However, in sequencing assembly 214A, cam lobe 304(2) of shuttle cam 220A(1) is engaging cam recess 308(1) of timing cam 218A(1) thereby blocking clockwise rotation relative to hinge shaft 208(2). Similarly, relative to sequencing assembly 214B, cam lobe 318(2) of shuttle cam 220B(1) is engaging cam recess 320 of timing cam 218B(2) to prevent rotation relative to hinge shaft 208(3). Returning to sequencing assembly 214A, cam lobe 310(2) of shuttle cam 220A(2) is engaging cam recess 314 first portion cam 222A(1) to prevent rotation relative to hinge shaft 208(4). Thus, at this point, clockwise rotation is only possible at hinge shaft 208(1).

FIGS. 3A-6 and 3B-6 show sequential multi-axis hinge assembly 106A. At this point, in sequencing assembly 214A the cam lobe 304(1) of shuttle cam 220A(1) is now aligned with cam recess 302 in hinge frame 204(1). The shuttle cam is now free to move laterally (right to left on the drawing page) to an extent defined by the elongate configuration of the aperture 300A(1) compared to hinge shaft 208(1). Lateral movement of the shuttle cam 220A(1) will disengage the shuttle cam from timing cam 218A(1) and allow rotation around hinge shaft 208(2). Hinge shafts 208(3) and 208(4) remain constrained for the reasons described above relative to FIGS. 3A-5 and 3B-5.

FIGS. 3A-7 and 3B-7 show shuttle cam 220A(1) has vacated timing cam 218A(1) and moved left into cam recess 302, which allows clockwise rotation of hinge shaft 208(2), timing cam 218A(1) and shuttle cam 220B(1). Now, after the clockwise rotation cam lobe 318(1) of shuttle cam 220B(1) is aligned with cam recess 316 of timing cam 218B(1). The shuttle cam 220B(1) can now move orthogonally (e.g., laterally right to left) on hinge shaft 208(2).

FIGS. 3A-8 and 3B-8 show shuttle cam 220B(1) has vacated timing cam 218B(2) and moved left into cam recess 316 of timing cam 218B(1), which allows clockwise rotation of hinge shaft 208(3), timing cam 218B(2), and shuttle cam 220A(2). Now, after the clockwise rotation cam lobe 310(1) of shuttle cam 220A(2) is aligned with cam recess 308(2) of timing cam 218A(1). The shuttle cam 220A(2) can now move orthogonally (e.g., laterally right to left) on hinge shaft 208(3). This movement of the shuttle cam 220A(2) disengages cam lobe 310(2) from cam recess 314 of first portion cam 222A(1).

FIGS. 3A-9 and 3B-9 show first portion cam 222A(1), hinge shaft 208(4), and hinge frame 204(4) rotated clockwise until the sequential multi-axis hinge assembly 106A reaches the open position. The rotation could occur because shuttle cam 220A(2) disengages cam lobe 310(2) from cam recess 314 of first portion cam 222A(1) and moved laterally and engaged cam recess 308(2) in timing cam 218A(1) to allow the first portion cam to rotate. A full cycle of sequential closing rotation and sequential opening rotation has been described and the sequential multi-axis hinge assembly 106A is now back at the fully open orientation of FIGS. 3A-1 and 3B-1. Stated another way, the sequential multi-axis hinge assembly can control the sequence or order of rotation around individual hinge axes (e.g., hinge shafts). For example, hinge axis one, then hinge axis two, then hinge axis three, then hinge axis four in opening rotation and then hinge axis four, then hinge axis three, then hinge axis two, then hinge axis one in closing order. Further, the sequential multi-axis hinge assembly can define the range of rotation around the individual hinge axes and can block rotation around the other hinge axes until the range of rotation is complete.

The sequential nature of sequential multi-axis hinge assembly 106A is described relative to FIGS. 3A-1 through 3B-9. The discussion now returns to FIGS. 2B and 2C to note some of the structural features of sequential multi-axis hinge assembly 106A. As described above, the shuttle cams 220 can provide the sequencing aspect relating to the individual hinge shafts 208. Further, in some implementations, the shuttle cams can provide the sequencing aspect without interrupting the hinge shafts (e.g., the hinge shafts pass through the shuttle cams). This feature can allow the hinge shafts 208 and the hinge frames 204 to be co-extensive with one another and sharing common endpoints (e.g., co-terminus) as illustrated by being contained within a region R (FIG. 2B). This co-extensive and co-terminus configuration can offer structural advantages to the sequential multi-axis hinge assembly 106A. For instance, the sequential multi-axis hinge assembly 106A is less likely to flex and/or bounce when exposed to forces from the user, such as touching the display. Additionally, the shuttle cams allow hinge points of the sequential multi-axis hinge assembly 106A to be linearly arranged along a single straight line L (FIG. 2B). This configuration also contributes to a more robust multi-axis hinge that is less likely to flex or bounce than other designs. Note also, that while the illustrated implementation includes four hinge axes, the present concepts can be applied to implementations employing two, three, or more than four hinge axes.

Figure 4A:
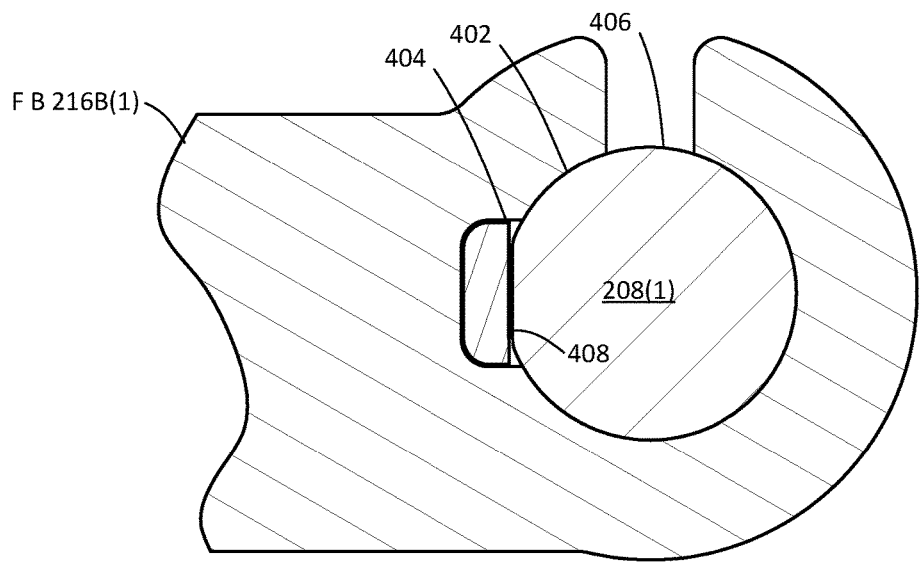
FIGS. 4A-4C illustrate cross sectional views of an example friction band example in accordance with some implementations.
Figure 4B:
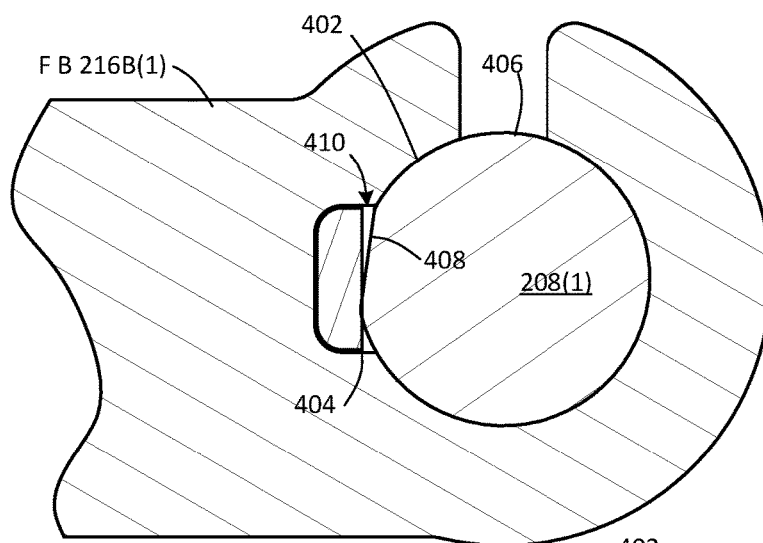
Figure 4C:
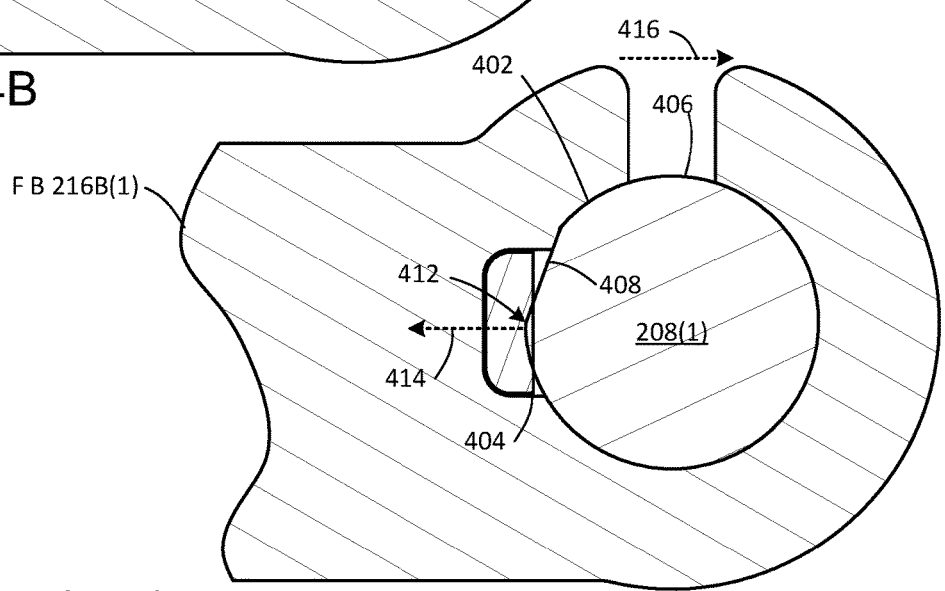

FIGS. 4A-4C collectively show another implementation of friction band 216B(1) and hinge shafts 208(1) that are similar to the implementation illustrated in FIG. 2C. In this case, the friction band 216(1) defines a generally circular passageway 402 for the hinge shaft 208(1). However, the friction band 216(1) includes a region 404 that impinges within a diameter of the generally circular passageway 402. Also, an outer profile 406 of the hinge shaft is generally circular but includes a cut-away flattened region 408. The flattened region 408 can correspond to the region 404 of the friction band and thereby bias the friction band and hinge shaft to this orientation as seen in FIG. 4A. Further, in this implementation, a slight gap exists between the region 404 and region 408. This slight gap can allow a few degrees of relatively low resistance rotation as seen by comparing FIG. 4A to 4B (e.g., specifically at 410). Further rotation causes interference or engagement between region 404 and 408 as indicated at 412 of FIG. 4C. This engagement causes a force represented by arrow 414 that will cause a slight opening of the friction band 216(1) as indicated by arrow 416. Thus, this implementation can bias the hinge shaft 208(1) to specific orientations (e.g., FIG. 4A) and allow low resistance to rotation at some orientations (e.g., FIG. 4B) and higher resistance to rotation at other orientations (e.g., FIG. 4C). Other configurations of these aspects are contemplated beyond those illustrated in FIGS. 2C, 2D, and 4A-4C.

The elements of the sequential multi-axis hinge assemblies can be formed of various materials utilizing various techniques. For instance, various metals may be employed, such as iron, steel, magnesium, zinc, titanium, and/or aluminum. The metals can be formed into specific shapes by machining, casting, metal injection molding, and/or 3D printing, among others. Other implementations can use other materials, such as polymers and/or composites, which also may be shaped in various ways, such as molding, machining, and/or 3D printing, among others.

The detailed description provided above in connection with the appended drawings is intended as a description of examples and is not intended to represent the only forms in which the present examples may be constructed or utilized.

References to "an example," "one implementation," "an implementation," "one example," "an example" and the like, indicate that the described, implementation or example may include a particular feature, structure or characteristic, but every, implementation or example may not necessarily include the particular feature, structure or characteristic. Moreover, such phrases are not necessarily referring to the same implementation or example. Further, when a particular feature, structure or characteristic is described in connection with an implementation or example, it is to be appreciated that such feature, structure, or characteristic may be implemented in connection with other implementations or examples whether or not explicitly described.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

Various device examples are described above. Additional examples are described below. One example includes a device that comprises first and second portions rotatably coupled by a set of hinge frames configured to rotate around individual frame axes defined by hinge shafts, individual hinge frames of the set of hinge frames including individual cams positioned over a respective hinge shaft. At least one individual cam comprises a shuttle cam that controls a relative sequence of rotation of the individual hinge frames by moving orthogonally to the respective hinge shaft.

Another example can include any of the above and/or below examples where other individual cams comprise timing cams and wherein the shuttle cam is positioned between two timing cams.

Another example can include any of the above and/or below examples where the shuttle cam defines an elongate aperture through which the individual hinge shaft passes and wherein the shuttle cam is configured to move orthogonally to the respective hinge shaft to an extent defined by the elongate aperture.

Another example can include any of the above and/or below examples where the shuttle cam includes rails that are received in recesses in individual cams adjacent to the shuttle cam and the rails and recesses limit rotation of the shuttle cam.

Another example can include any of the above and/or below examples where the shuttle cam comprises opposing first and second cam lobes.

Another example can include any of the above and/or below examples where at least two other cams comprise timing cams positioned on opposite sides of the shuttle cam.

Another example can include any of the above and/or below examples where a first of the timing cams comprises a first cam recess and a second of the timing cams comprises a second cam recess.

Another example can include any of the above and/or below examples where either the first cam lobe engages the first cam recess or the second cam lobe engages the second cam recess, but the first cam lobe does not engage the first cam recess at a same time that the second cam lobe engages the second cam recess.

Another example can include any of the above and/or below examples where the first cam recess and the second cam recess have a depth that is equal to a difference between a width of the respective hinge shaft and a width of an aperture of the shuttle cam that the respective hinge shaft passes through.

Another example can include any of the above and/or below examples where all of the individual hinge frames of the set of hinge frames and all of the hinge shafts are co-extensive and co-terminus.

Another example can include any of the above and/or below examples where adjacent hinge frames define shaft enclosures through which an individual hinge shaft passes to form an individual hinge and wherein all hinges of the set of hinge frames are arranged along a straight line.

Another example can include any of the above and/or below examples further comprising friction interfaces that create resistance to rotation on individual hinge shafts.

Another example can include any of the above and/or below examples where the friction interfaces comprise friction bands through which individual hinge shafts pass.

Another example can include any of the above and/or below examples where the resistance is uniform through a range of rotation around the individual hinge shafts.

Another example can include any of the above and/or below examples where the resistance is the same in clockwise rotation and counter-clockwise rotation.

Another example can include any of the above and/or below examples where the resistance is different in clockwise rotation and counter-clockwise rotation.

Another example can include any of the above and/or below examples where the first portion comprises a display device and the second portion comprises an input device.

Another example can include a sequential multi-axis hinge assembly comprising a set of hinge frames configured to rotate around frame axes defined by hinge shafts. The sequential multi-axis hinge assembly further comprises a shuttle cam defining an elongate aperture through which an individual hinge shaft extends, the shuttle cam configured to move orthogonal to an individual frame axis on the individual hinge shaft to control an order of rotation around the individual frame axis and an adjacent individual frame axis.

Another example can include any of the above and/or below examples where the shuttle cam is configured to engage a cam recess associated with an adjacent individual hinge shaft to block rotation of the adjacent individual hinge shaft.

Another example can include a device comprising a set of hinges that rotate around a set of hinge shafts to couple a first portion to a second portion and a shuttle cam through which an individual hinge shaft passes, the shuttle cam configured to move orthogonally relative to the individual hinge shaft to block rotation of the individual hinge shaft or an adjacent individual hinge shaft.

The invention claimed is:

1. A device, comprising:
   a first portion and a second portion; and
   a sequential multi-axis hinge assembly that rotatably couples the first and second portions, the sequential multi-axis hinge assembly including:
   hinge shafts that define frame axes,
   hinge frames, an individual hinge frame positioned over and configured to rotate around an individual hinge shaft and an adjacent hinge shaft, an adjacent hinge frame positioned over and configured to rotate around the adjacent hinge shaft and a further adjacent hinge shaft, and a sequencing assembly including a shuttle cam positioned over the individual hinge shaft and a timing cam positioned over the adjacent hinge shaft, the shuttle cam configured to move orthogonally to the individual hinge shaft and interact with a recess of the timing cam to control a relative sequence of rotation of the individual hinge frame around the adjacent hinge shaft with respect to the adjacent hinge frame.

2. The device of claim 1, further comprising another sequencing assembly comprising another shuttle cam positioned over the adjacent hinge shaft and another timing cam positioned over the individual hinge shaft, the another shuttle cam configured to move orthogonally to the adjacent hinge shaft.

3. The device of claim 1, wherein the shuttle cam defines an elongate aperture through which the individual hinge shaft passes and wherein the shuttle cam is configured to move orthogonally to the individual hinge shaft to an extent defined by the elongate aperture.

4. The device of claim 1, wherein the shuttle cam includes a rail that is configured to be received in the recess of the timing cam, and interaction of the rail and the recess limit rotation of the shuttle cam.

5. The device of claim 1, wherein the shuttle cam comprises opposing first and second cam lobes.

6. The device of claim 5, wherein the shuttle cam interacts with a second adjacent timing cam positioned on another adjacent hinge shaft to the individual hinge shaft that is opposite the adjacent hinge shaft.

7. The device of claim 6, wherein the recess comprises a first cam recess and the second adjacent timing cam comprises a second cam recess.

8. The device of claim 7, wherein either the first cam lobe engages the first cam recess or the second cam lobe engages the second cam recess, but the first cam lobe does not engage the first cam recess at a same time that the second cam lobe engages the second cam recess.

9. The device of claim 7, wherein the first cam recess and the second cam recess have a depth that is equal to a difference between a width of the individual hinge shaft and a width of an aperture of the shuttle cam that the individual hinge shaft passes through.

10. The device of claim 1, wherein all of the hinge shafts are co-terminus in a direction parallel to the frame axes.

11. The device of claim 1, wherein the individual hinge frame defines a first shaft enclosure that secures the individual hinge frame to the individual hinge shaft and a second shaft enclosure that secures the individual hinge frame to the adjacent hinge shaft.

12. The device of claim 1, further comprising a friction interface that creates resistance to rotation on the individual hinge shaft.

13. The device of claim 12, wherein the friction interface comprises a friction band through which the individual hinge shaft passes.

14. The device of claim 13, wherein the resistance is uniform through a range of rotation of the friction band around the individual hinge shaft.

15. The device of claim 13, wherein the resistance is non-uniform through a range of rotation of the friction band around the individual hinge shaft.

16. The device of claim 13, wherein the resistance is the same in clockwise rotation and counter-clockwise rotation of the friction band around the individual hinge shaft.

17. The device of claim 13, wherein the resistance is different in clockwise rotation and counter-clockwise rotation of the friction band around the individual hinge shaft.

18. A sequential multi-axis hinge assembly comprising:

hinge shafts that define frame axes;

hinge frames interconnected by successive overlapping pairs of the hinge shafts such that an individual hinge frame is interconnected by an individual hinge shaft and an adjacent individual hinge shaft and configured to rotate around respective frame axes of the individual hinge shaft and the adjacent individual hinge shaft; and a shuttle cam defining an elongate aperture through which the individual hinge shaft extends, the shuttle cam configured to move orthogonal to an individual respective frame axis of the individual hinge shaft and to interact with a timing cam associated with the adjacent individual hinge shaft to control an order of rotation of the individual hinge frame around the individual respective frame axis relative to rotation of an adjacent individual hinge frame around an adjacent individual frame axis of the adjacent individual hinge shaft.

19. The sequential multi-axis hinge assembly of claim 18, wherein the timing cam includes a cam recess and is positioned on the adjacent individual hinge shaft and the shuttle cam is configured to engage the cam recess to block rotation of the adjacent individual hinge frame.

20. A device, comprising:

hinges that couple a first portion to a second portion, the hinges comprising hinge frames that rotate around and secure overlapping pairs of hinge shafts; and, a shuttle cam through which an individual hinge shaft of an individual pair passes, the shuttle cam configured to move orthogonally relative to the individual hinge shaft and to interact with a timing cam associated with an adjacent individual hinge shaft of the individual pair to block rotation of an individual hinge frame of the individual pair relative to the adjacent individual hinge shaft.

* * * * *